(12) United States Patent
Sen

(10) Patent No.: US 11,481,429 B2
(45) Date of Patent: Oct. 25, 2022

(54) SYSTEMS AND METHODS FOR HANDLING CONTEXTUAL QUERIES

(71) Applicant: Rovi Guides, Inc., San Jose, CA (US)

(72) Inventor: Susanto Sen, Karnataka (IN)

(73) Assignee: Rovi Guides, Inc., San Jose, CA (US)

(*) Notice: Subject to any disclaimer, the term of this patent is extended or adjusted under 35 U.S.C. 154(b) by 0 days.

(21) Appl. No.: 17/253,590

(22) PCT Filed: Sep. 26, 2018

(86) PCT No.: PCT/US2018/052929
§ 371 (c)(1),
(2) Date: Dec. 17, 2020

(87) PCT Pub. No.: WO2020/068068
PCT Pub. Date: Apr. 2, 2020

(65) Prior Publication Data
US 2021/0209151 A1    Jul. 8, 2021

(51) Int. Cl.
G06F 16/48     (2019.01)
G06F 16/487    (2019.01)
G06F 16/432    (2019.01)
H04L 67/50     (2022.01)

(52) U.S. Cl.
CPC .......... G06F 16/489 (2019.01); G06F 16/433 (2019.01); G06F 16/487 (2019.01); H04L 67/535 (2022.05)

(58) Field of Classification Search
CPC ..... G06F 16/489; G06F 16/487; G06F 16/433
USPC ....................................................... 707/769
See application file for complete search history.

(56) References Cited

U.S. PATENT DOCUMENTS 9,137,308 B1 *  9/2015  Petrou ..................... G06F 16/00
9,865,173 B2 *  1/2018  Seymour ................. G09B 5/06

OTHER PUBLICATIONS

Gemmell Jim, et al., "Passive Capture and Ensuing Issues for a Personal Lifetime Store", CARPE'04: Proceedings of the the 1st ACM workshop on Continuous archival and retrieval of personal experiences, Oct. 2004 pp. 48-55, https://doi.org/10.1145/1026653.1026660, Oct. 15, 2004, 1, 19.

(Continued)

*Primary Examiner* — Kimberly L Wilson
(74) *Attorney, Agent, or Firm* — Haley Guiliano LLP

(57) ABSTRACT

Systems and methods for facilitating contextual queries based on media samples automatically captured by a computing device are disclosed herein. A server receives from a computing device over a communication network, a media sample of a media asset automatically captured by the computing device. The server obtains contextual information corresponding to the captured media sample. The server stores the media sample in a memory indexed by the contextual information. The server receives, from the computing device over the communication network, a query that includes a criterion but lacks an identifier of the media asset. The server identifies the media sample in the memory by matching the query criterion to the contextual information. The server generates a reply to the query based on the identifying of the media sample and communicates the reply to the computing device over the communication network.

20 Claims, 12 Drawing Sheets

(56) References Cited

OTHER PUBLICATIONS

Khan, Zada Wazir, et al., "Mobile Phone Sensing Systems: A Survey", W. Z. Khan, Y. Xiang, M. Y. Aalsalem and Q. Arshad, "Mobile Phone Sensing Systems: A Survey," in IEEE Communications Surveys & Tutorials, vol. 15, No. 1, pp. 402-427, First Quarter 2013, doi: 10.1109/SURV.2012.031412.00077., Apr. 3, 2012, 14-18, 28-34.

International Search Report and Written Opinion in PCT/US2018/052929 dated Apr. 4, 2019.

* cited by examiner

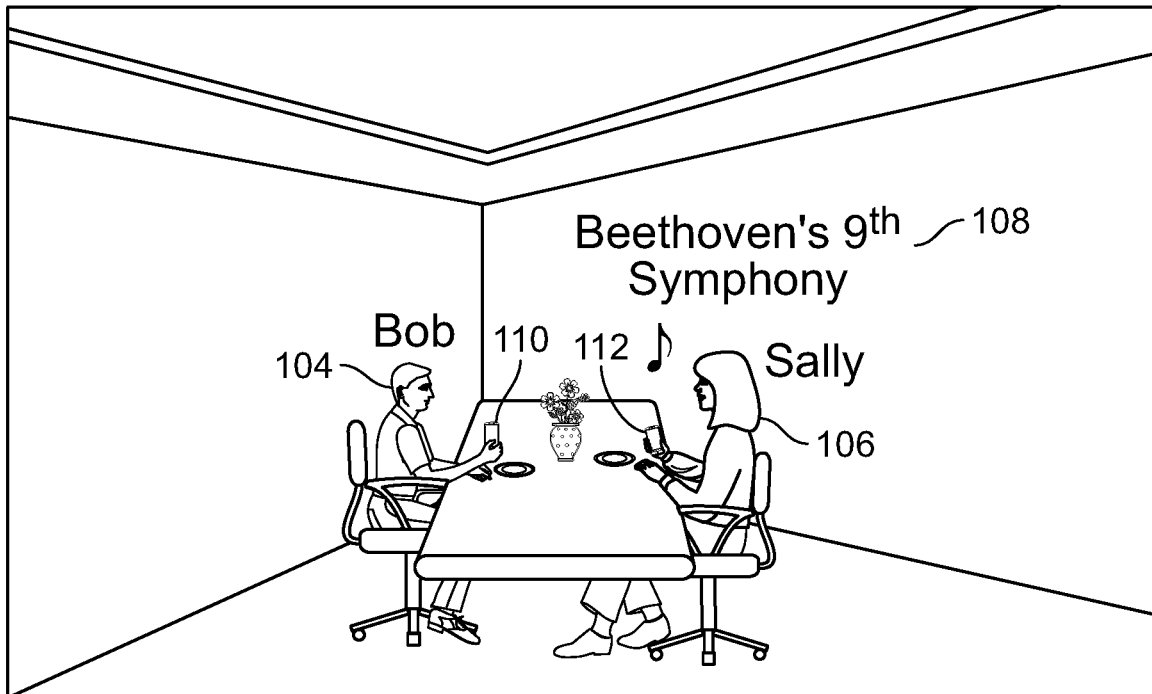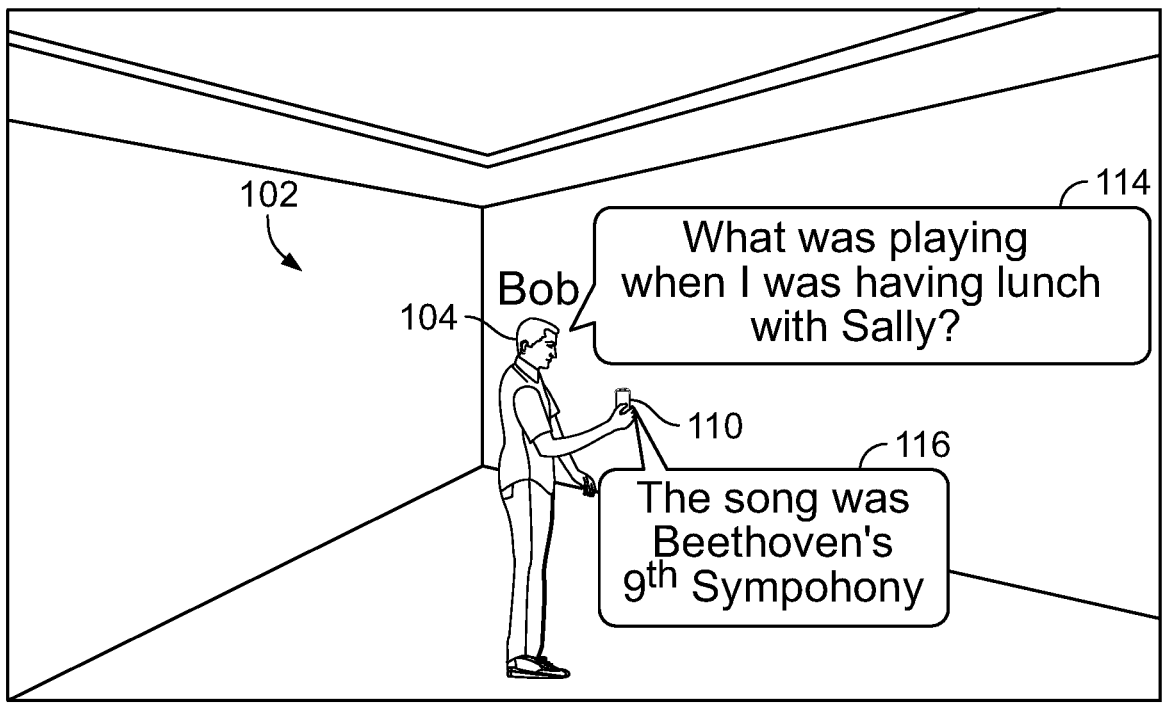
FIG. 1

| Media Sample Identifier | Media Sample Fingerprint | Capturing Device Identifier | Time Identifier | Location Identifier | Activity Identifier | Associated Device Identifier(s) | Link to Media Sample | Media Asset Identifier | Media Asset Metadata | | | Link to Media Asset | Media Asset Fingerprint | Event Identifier | Expiration Date/Time |
|---|---|---|---|---|---|---|---|---|---|---|---|---|---|---|---|
| | | | | | | | | | Title | Album | Artist | | | | |
| MS_ID1 | MS_FP1 | CD_ID1 | TIME_ID1 | LOC_ID1 | ACT_ID1 | AD_ID1 | MS_LINK1 | MA_ID1 | TITLE_1 | ALB_1 | ART_1 | MA_LINK1 | MA_FP1 | EVENT | EXP_1 |
| MS_ID2 | MS_FP2 | CD_ID2 | TIME_ID2 | LOC_ID2 | ACT_ID2 | AD_ID2 | MS_LINK2 | MA_ID2 | TITLE_2 | ALB_2 | ART_2 | MA_LINK2 | MA_FP2 | EVENT | EXP_2 |
| MS_ID3 | MS_FP3 | CD_ID3 | TIME_ID3 | LOC_ID3 | ACT_ID3 | AD_ID3 | MS_LINK3 | MA_ID3 | TITLE_3 | ALB_3 | ART_3 | MA_LINK3 | MA_FP3 | EVENT | EXP_3 |
| MS_ID4 | MS_FP4 | CD_ID4 | TIME_ID4 | LOC_ID4 | ACT_ID4 | AD_ID4 | MS_LINK4 | MA_ID4 | TITLE_4 | ALB_4 | ART_4 | MA_LINK4 | MA_FP4 | EVENT | EXP_4 |
| MS_ID5 | MS_FP5 | CD_ID5 | TIME_ID5 | LOC_ID5 | ACT_ID5 | AD_ID5 | MS_LINK5 | MA_ID5 | TITLE_5 | ALB_5 | ART_5 | MA_LINK5 | MA_FP5 | EVENT | EXP_5 |

FIG. 6

SYSTEMS AND METHODS FOR HANDLING CONTEXTUAL QUERIES

CROSS-REFERENCE TO RELATED APPLICATION

This application is a United States National Phase Application filed under 35 U.S.C. § 371 of International Patent Application No. PCT/US2018/052929, filed on Sep. 26, 2018 which is hereby incorporated by reference in its entirety.

BACKGROUND

The present disclosure relates to systems for handling queries lacking media asset identifiers, and more particularly to systems and related processes for facilitating contextual queries based on media samples automatically captured by a computing device.

SUMMARY

With the current advanced state of search engines, people have come to expect instant, on-demand access to any information they desire, with minimal effort required of them to access such information. Indeed, one popular search engine handles billions of search queries each day to provide such information access. However, people are not satisfied by merely receiving any search results for their queries; they expect accurate, relevant search results. Search engines can often provide relevant search results for a query that includes a sufficient number of relevant identifiers. One technical challenge in providing relevant search results, however, arises when a searcher is unaware of identifiers relevant to their search. For example, someone may hear a song and wish to search for that song but not know its name. Similarly, someone may wish to obtain information about an event occurring at a particular time and/or location but be unaware of any relevant identifiers, such as the event name, that could form the basis of a search query. Accordingly, it would be desirable to have a system that can generate accurate, relevant search results for queries that lack relevant identifiers. Although present systems can sometimes accurately identify, without any identifier-based query, a song presently being captured by a smartphone, such systems are unable to handle queries about songs or other content that a user consumed at some time in the past, queries about past events, and/or the like. Indeed, present systems lack a mechanism for keeping track of previously encountered content or events, much less the contexts in which the content or events were encountered.

In view of the foregoing, the present disclosure provides systems and related processes that automatically monitor for the presence of media assets via a computing device, such as a smartphone, and keep track of the contexts in which the media assets were consumed. In this manner, the systems and processes of the present disclosure can handle queries from a smartphone user about content that the user consumed at some time in the past, past events that the user previously encountered, and/or the like, even when those queries lack relevant identifiers.

In one aspect, the present disclosure provides an illustrative method for facilitating contextual queries based on media samples automatically captured by a computing device. For instance, the computing device, such as a smartphone, may be configured to automatically (e.g., without requiring user input) monitor its environment for media samples (e.g., audio samples, video samples, image samples, and/or the like) periodically captured by its microphone or camera. The computing device can locally store and/or process the media sample and/or can communicate the media sample to a server over a communication network for remote storage and/or processing.

For each captured media sample, the computing device and/or server also obtains and stores, in one or more memories, contextual information that indicates a context in which the computing device captured the media sample. In various examples, the captured media sample(s) and the contextual information may be stored in the same memory or in separate memories. The contextual information may include, for example, a time identifier indicating a time at which the computing device captured the media sample, a location identifier indicating a location at which the computing device captured the media sample, an activity identifier indicating an activity (e.g., traveling in a taxi) that was occurring during capture of the media sample, a device identifier indicating that a second device (e.g., a second smartphone) was near the computing device during capture of the media sample, and/or the like. The items of contextual information serve as indices to the media sample in the computing device memory and/or the server memory. By periodically capturing media samples and indexing those samples with contextual information in memory, the computing device helps assemble a database that can be used to generate responses to queries that include contextual information but lack relevant identifiers.

The computing device receives a query entered by way of a user interface, such as a touch screen, a microphone, and/or the like. In various embodiments, the computing device locally processes the query and/or forwards the query to the server over the communication network for remote processing. Although the query includes one or more search criteria, it lacks an identifier of the media asset. The computing device identifies the media sample in memory by matching the query criteria to the stored contextual information and generates a reply to the query. Optionally, the server may identify the media sample, generate the query reply, and communicate that reply to the computing device over the communication network. The computing device presents the query reply via its display and/or speakers.

In some aspects, the method also includes identifying a media asset of the captured media sample and/or media asset metadata corresponding to the media asset. For example, if the captured media sample includes a portion of a song, the computing device and/or the server identify the song and/or corresponding song metadata (e.g., a title, an artist, or an album). In some instances, the song may be identified by generating a media fingerprint (e.g., an audio fingerprint) based on the media sample and identifying the media asset based on the media fingerprint. If the media asset includes video content, the identifying the media asset in the database based on the media fingerprint can include identifying, in the database, an association between the video content and the audio fingerprint. For instance, the computing device may capture an audio sample of a movie and then identify the movie based on the audio sample. The computing device and/or the server link the media sample stored in the memory to any corresponding media asset and/or media asset metadata that may have been identified. In various embodiments, for instance, depending on what the query requests, the reply may include the media sample itself, the media asset, an identifier of the media asset, the media asset metadata, and/or the like.

As mentioned above, the contextual information may include a time identifier, which may be generated at the computing device based on a time indicated by a clock of the computing device when the media sample is captured. The computing device may communicate the time identifier to the server over the communication network for remote storage and/or processing. Alternatively, the server may generate the time identifier based on a time when the media sample is received from the computing device.

The contextual information, in some examples, may include a location identifier. For instance, the computing device may generate the location identifier based on a location indicated by a geo-location subsystem (e.g., based on a global positioning system, such as GPS) of the computing device when the media sample is captured. The computing device may communicate the location identifier to the server over a communication network for storage and/or processing.

In some aspects, the computing device that captured the media sample is associated with one or more other computing devices, such as a smartphone that was located near the computing device during the media sample capture and/or a smartphone that belongs to another user with whom the computing device owner is linked via a social media platform. Accordingly, the contextual information sometimes includes an identifier of a second computing device associated with the first computing device that captured the media sample. In a circumstance where the second computing device is located near the sample-capturing computing device, the sample-capturing computing device may determine that the second computing device is nearby, and may identify the second computing device, through near-field communication between the two devices. In a circumstance where the users of the computing devices are linked via a social media platform, the computing device may determine, based on a social media application installed thereon, that the computing device is associated with the second computing device. Optionally, the computing device may communicate the identifier of the second computing device to the server over the communication network for remote storage and/or processing. Additionally or alternatively, the computing device and/or the server may determine that the computing device is associated with the second computing device by searching an online social media database for social media links involving the computing device and/or a social media user account registered with the computing device.

As another example, the contextual information may include an activity identifier indicating an activity that was underway during capture of the media sample. In one example, the activity identifier includes transportation information (e.g., indicating that the user of the computing device was traveling in a taxi or ride-sharing service during capture of the media sample). The computing device may obtain the transportation information by way of a transportation application installed on the device or by receiving the transportation information from an online transportation provider system. Optionally, the computing device may communicate the activity identifier to the server over the communication network.

BRIEF DESCRIPTION OF THE DRAWINGS

The above and other objects and advantages of the disclosure will be apparent upon consideration of the following detailed description, taken in conjunction with the accompanying drawings, in which like reference characters refer to like parts throughout, and in which:

FIG. 1 shows an illustrative scenario in which a contextual query may be handled in accordance with some embodiments of the present disclosure;

FIG. 6 shows an example portion of a database for facilitating contextual queries, such as the database generated according to the process of FIG. 4, in accordance with some aspects;

DETAILED DESCRIPTION

Figure 2:
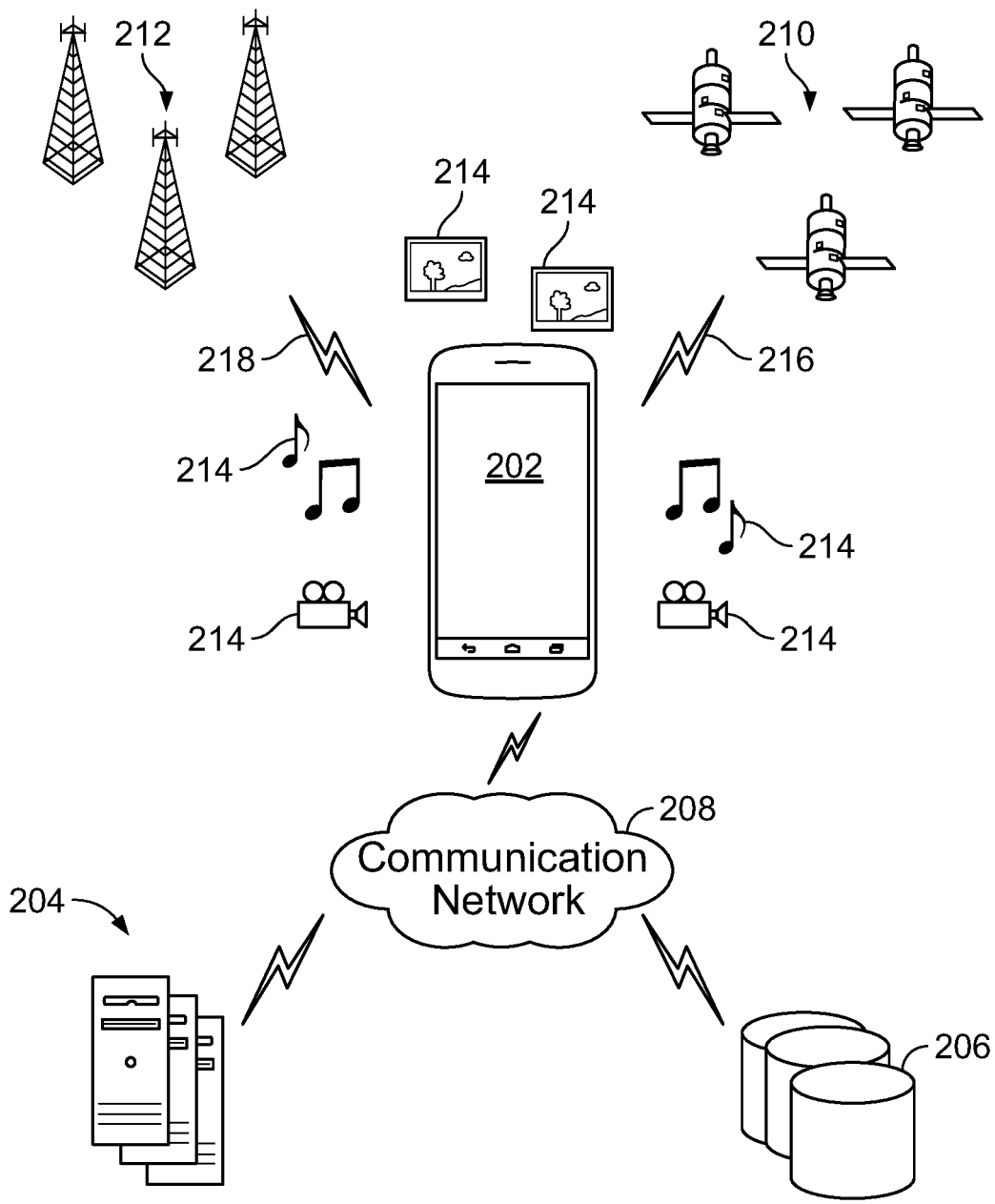
FIG. 2 is a block diagram of an illustrative system for facilitating contextual queries, in accordance with some embodiments of the disclosure.

FIG. 1 shows an illustrative scenario in which a contextual query may be handled in accordance with some embodiments of the present disclosure. In diagram 100, Bob 104 hears a song 108 while out at lunch at a restaurant with Sally 106. Bob 104 is carrying a smartphone 110 that automatically and passively (e.g., without requiring input from Bob 104) captures a sample of the song 108 along with current contextual information (e.g., information about time, location, nearby smartphones, and/or the like). Sally 106 is also carrying a smartphone 112 that also may automatically and passively (e.g., without requiring input from Sally 106) capture a sample of the song 108 along with contextual information. In diagram 102, at some later time, after Bob 104 has left the restaurant, Bob 104 wishes to know what song was playing while they were at the restaurant. Bob 104 enters into his smartphone 110 a query 114 requesting the title of the song 108 that was playing while he was having lunch with Sally 106. Although the query 114 includes contextual information, indicating a context in which the song was captured, the query 114 lacks an identifier of the song. In accordance with the embodiments of the present disclosure, the smartphone 110 is able to generate a query reply 116 identifying the song 108 based on the contextual information included in the query 114.

As an example, based on the query language "when I was having lunch," the smartphone 110 can identify a time window within which the song 108 was captured by determining when Bob 104 was having lunch. For instance, the smartphone 110 may do this by: (1) identifying a time range during which information about the location of the smartphone 110 (e.g., obtained using location services) in conjunction with known restaurant locations (e.g., obtained via map software) indicate that the smartphone 110 (and by extension, Bob 104) was located at a restaurant and/or (2) obtaining from the smartphone 110 and/or from online payment records information indicating a time at which Bob 104 used a payment instrument (e.g., a mobile payment application on the smartphone 110, a credit card, and/or the like) to complete a point-of-sale transaction at a restaurant. Additionally or alternatively, based on the query language "when I was . . . with Sally," the smartphone 110 can identify a time window within which the song 108 was captured by determining when Bob 104 was with Sally 106. For example, the smartphone 110 may have automatically and passively captured a wireless signal from the smartphone 112 while the smartphones 110 and 112 were within a near-field communication range of one another and may have stored that together with the captured media sample. Additionally or alternatively, a server (not shown in FIG. 1) may separately capture information about the location of both the smartphones 110 and 112 (e.g., obtained using location services of each smartphone 110, 112). The server may then determine when Bob 104 was with Sally 106 by determining, based on the captured location information, when the smartphones 110 and 112 were near one another (e.g., within a particular distance range).

FIG. 2 is a block diagram of an illustrative system 200 for facilitating contextual queries, in accordance with some embodiments of the disclosure. The system 200 includes a computing device 202 (e.g., a smartphone, a smart speaker, and/or the like) and a geo-location system, which may include satellites 210 (e.g., based on a global positioning system, such as GPS), radiolocation transceivers 212, and/or the like, communicatively coupled to the computing device 202 by way of communication paths 216 and/or 218, respectively. As described in further detail elsewhere herein, the computing device 202 is configured to automatically capture media samples 214 (e.g., audio samples, video samples, image samples, and/or the like) to facilitate contextual queries based on the captured media samples.

In some embodiments, the system 200 may also include a communication network 208 (e.g., the Internet) and one or more server(s) 204 and/or cloud-based storage 206 communicatively coupled to the computing device 202 by way of the communication network 208. In this manner, the storage of data described herein may be performed at the computing device 202, at the server(s) 204, at the storage 206, and/or at any combination thereof. Similarly, the processing of data described herein may be performed at the computing device 202, at the server(s) 204, and/or at any combination thereof.

Figure 3:
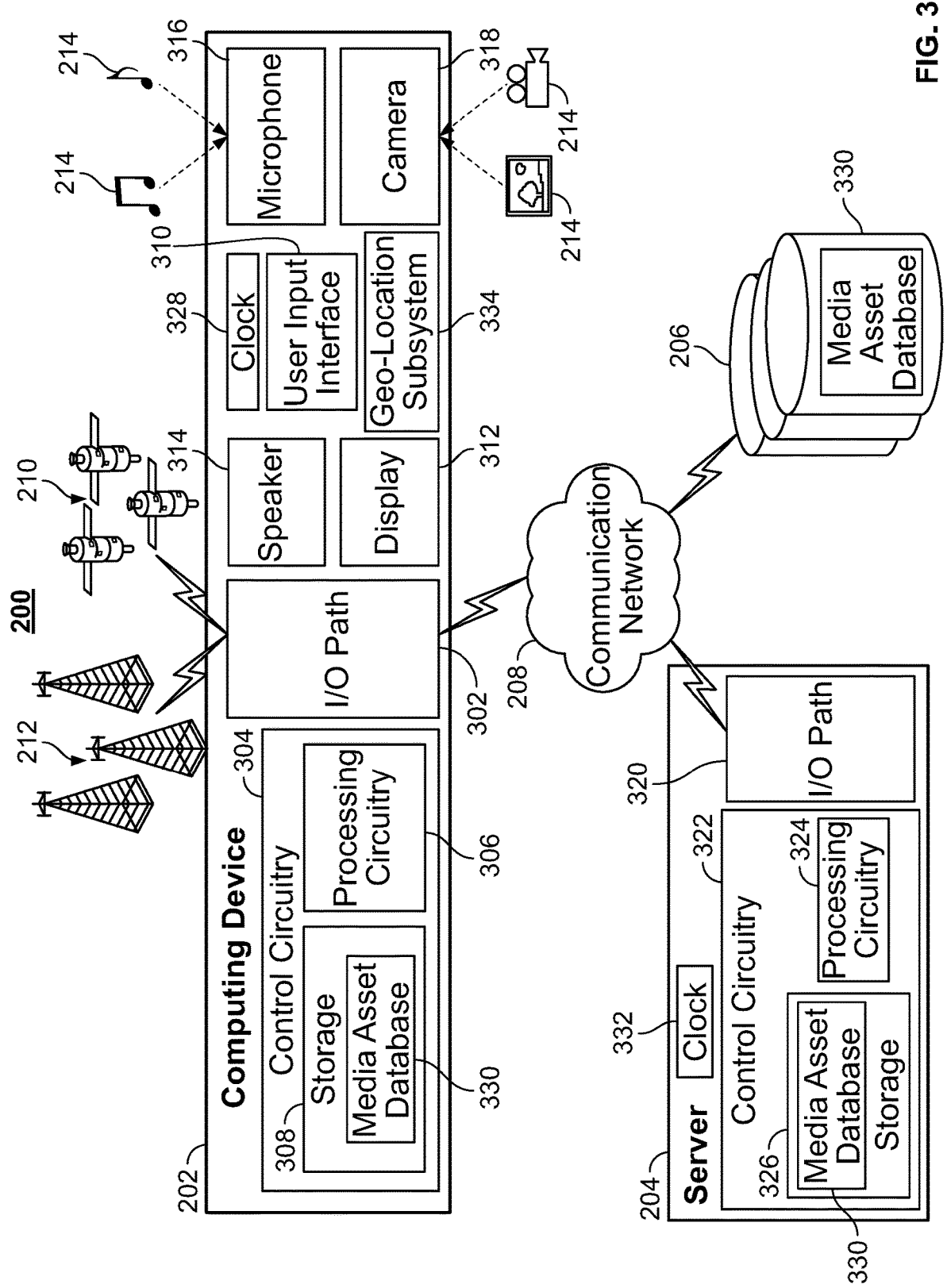
FIG. 3 is a block diagram showing details of the computing device and server(s) of the system shown in FIG. 2, in accordance with some illustrative embodiments of the disclosure.

FIG. 3 is a block diagram showing illustrative details of the computing device 202 and server(s) 204 of the system 200 shown in FIG. 2, in accordance with some embodiments. Computing device 202, which may be a smartphone, a smart speaker, a laptop, and/or the like, includes I/O path 302, control circuitry 304, user input interface 310, display 312, speaker(s) 314, microphone 316, camera 318, clock 328, and geo-location subsystem 334. Control circuitry 304 includes processing circuitry 306 and storage 308. Server 204 includes I/O path 320, control circuitry 322, and clock 332. Control circuitry 322 includes processing circuitry 324 and storage 326. In various embodiments, a media asset database 330 (described below) may be stored in storage 308, storage 326, and/or cloud storage 206. Additionally, as one of skill in the art will appreciate, various steps of the procedures herein (e.g., procedure 400) may be implemented by the computing device 202, the server(s) 204, the cloud storage 206, and/or any combination thereof. As described in further detail below, clock 328 and/or clock 332 provide computing device 202 and/or server 204 with time information that is utilized in accordance with procedures herein, and geo-location subsystem 330 provides computing device 202 and/or server 204 with location information that is utilized in procedures herein. Additional aspects of the components of computing device 202 and server 204 are described below.

Control circuitry 304, 322 may be based on any suitable processing circuitry such as processing circuitry 306, 324. As referred to herein, processing circuitry should be understood to mean circuitry based on one or more microprocessors, microcontrollers, digital signal processors, programmable logic devices, field-programmable gate arrays (FPGAs), application-specific integrated circuits (ASICs), etc., and may include a multi-core processor (e.g., dual-core, quad-core, hexa-core, or any suitable number of cores) or supercomputer. In some embodiments, processing circuitry may be distributed across multiple separate processors or processing units, for example, multiple of the same type of processing units (e.g., two Intel Core i9 processors) or multiple different processors (e.g., an Intel Core i7 processor and an Intel Core i9 processor). In some embodiments, control circuitry 304, 322 executes instructions for an application stored in memory (e.g., storage 308, 326). Specifically, control circuitry 304, 322 may be instructed by the application to perform the functions discussed above and below. For example, the application may provide instructions to control circuitry 304, 322 to generate displays. In some implementations, any action performed by control circuitry 304, 322 may be based on instructions received from the application.

Applications may be, for example, stand-alone applications implemented on computing devices. For example, the application may be implemented as software or a set of executable instructions which may be stored in storage 308, 326 and executed by control circuitry 304, 322 of computing device 202 and server 204, respectively. In some embodiments, applications may be client-server applications where only a client application resides on the computing device, and server application resides on a remote server. For example, applications may be implemented partially as a client application on control circuitry 304 of computing device 202 and partially on remote server 204 as a server application running on control circuitry 322 of the remote server 204. When executed by control circuitry 322 of the remote server 204, the application may instruct the control circuitry 322 to generate the application displays and transmit the generated displays to the computing device 202. The server application may instruct the control circuitry 322 to transmit data for storage on computing device 202. The client application may instruct control circuitry 304 of the receiving computing device 202 to generate the application displays.

The application may be implemented using any suitable architecture. For example, it may be a stand-alone application wholly-implemented on computing device 202 or server 204. In such an approach, instructions of the application are stored locally (e.g., in storage 308, 326), and data for use by the application is downloaded on a periodic basis (e.g., from an out-of-band feed, from an Internet resource, or using another suitable approach). Control circuitry 304, 322 may retrieve instructions of the application from storage 308, 326 and process the instructions to generate any of the displays discussed herein. Based on the processed instructions, control circuitry 304, 322 may determine what action to perform when input is received from input interface 310. For example, movement of a cursor on a display up/down may be indicated by the processed instructions when input interface 310 indicates that an up/down button was selected.

In some embodiments, the application is a client-server-based application. Data for use by a thick or thin client implemented on computing device 202 is retrieved on-demand by issuing requests to the server 204 remote to computing device 202. In one example of a client-server-based application, control circuitry 204 runs a web browser that interprets web pages provided by a remote server. For example, the remote server 204 may store the instructions for the application in storage 326. The remote server 204 may process the stored instructions using control circuitry 322 and generate the displays discussed above and below. The computing device 202 may receive the displays generated by the remote server 204 and may display the content of the displays locally via display 312. This way, the processing of the instructions is performed remotely by the server 204 while the resulting displays are provided locally on computing device 202. Computing device 202 may receive inputs from the user via input interface 310 and transmit those inputs to the remote server for processing and generating the corresponding displays. For example, computing device 202 may transmit a communication to the remote server indicating that an up/down button was selected via input interface 310. The remote server may process instructions in accordance with that input and generate a display of the application corresponding to the input (e.g., a display that moves a cursor up/down). The generated display is then transmitted to computing device 202 for presentation to the user.

In client-server-based embodiments, control circuitry 304 may include communications circuitry suitable for communicating with an application server or other networks or servers (e.g., server 204). The instructions for carrying out the above-mentioned functionality may be stored on the application server. Communications circuitry may include a cable modem, an integrated services digital network (ISDN) modem, a digital subscriber line (DSL) modem, a telephone modem, Ethernet card, or a wireless modem for communications with other equipment, or any other suitable communications circuitry. Such communications may involve the Internet or any other suitable communications networks or paths. In addition, communications circuitry may include circuitry that enables peer-to-peer communication of computing devices, or communication of computing devices in locations remote from each other.

In some embodiments, the application is downloaded and interpreted or otherwise run by an interpreter or virtual machine (run by control circuitry 304). In some embodiments, the application may be encoded in the ETV Binary Interchange Format (EBIF), received by control circuitry 304 as part of a suitable feed, and interpreted by a user agent running on control circuitry 304. For example, the application may be an EBIF application. In some embodiments, the application may be defined by a series of JAVA-based files that are received and run by a local virtual machine or other suitable middleware executed by control circuitry 304. In some of such embodiments (e.g., those employing MPEG-2 or other digital media encoding schemes), the application may be, for example, encoded and transmitted in an MPEG-2 object carousel with the MPEG audio and video packets of a program.

Computing device 202 and server 204 may transmit and receive content and data via input/output (hereinafter "I/O") paths 302 and 320, respectively. I/O path 302, 320 may provide content (e.g., broadcast programming, on-demand programming, Internet content, content available over a local area network (LAN) or wide area network (WAN), and/or other content) and data to control circuitry 304, 322. Control circuitry 304, 322 may be used to send and receive commands, requests, and other suitable data using I/O path 302, 320 over wired communication paths and/or wireless communication paths (e.g., paths 216 or 218 of FIG. 2). I/O path 302, 320 may connect control circuitry 304 and/or 322 (specifically processing circuitry 306 and/or 324) to one or more communications paths (described below). Although FIG. 2 and FIG. 3 show some communication paths as single paths to avoid overcomplicating the drawing, I/O functions may be provided by way of one or multiple communications paths.

Memory may be an electronic storage device provided as storage 308 that is part of control circuitry 304, storage 326 that is part of control circuitry 322, and/or as cloud storage 206. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 3D disc recorders, digital video recorders (DVR, sometimes called a personal video recorder, or PVR), solid state devices, quantum storage devices, gaming consoles, gaming media, or any other suitable fixed or removable storage devices, and/or any combination of the same. Storage 208 may be used to store various types of content and/or metadata described herein. Nonvolatile memory may also be used (e.g., to launch a boot-up routine and other instructions). Cloud-based storage, such as cloud storage 206, may be used to supplement storage 308 and/or 326 or instead of storage 308 and/or 326.

In some embodiments, computing device 202 may operate in a cloud computing environment to access cloud services, for example, by way of server 204 and/or cloud storage 206. In a cloud computing environment, various types of computing services for content sharing, storage or distribution (e.g., video sharing sites or social networking sites) are provided by a collection of network-accessible computing and storage resources (e.g., a combination of servers 204 and/or cloud storage 206), referred to as "the cloud." For example, the cloud can include a collection of server computing devices, which may be located centrally or at distributed locations, that provide cloud-based services to various types of users and devices connected via a network such as the Internet via communications network 208. These cloud resources may include one or more media asset databases 330. In addition or in the alternative, the remote computing sites may include other computing devices. For example, the other computing devices may provide access to a stored copy of a video or a streamed video. In such embodiments, computing devices may operate in a peer-to-peer manner without communicating with a central server.

The cloud provides access to services, such as content storage, content sharing, or social networking services, among other examples, as well as access to any content described above, for computing devices. Services can be provided in the cloud through cloud computing service providers, or through other providers of online services. For example, the cloud-based services can include a content storage service, a content sharing site, a social networking site, or other services via which user-sourced content is distributed for viewing by others on connected devices. These cloud-based services may allow a computing device to store content to the cloud and to receive content from the cloud rather than storing content locally and accessing locally-stored content.

Cloud resources may be accessed by a computing device using, for example, a web browser, an application, a desktop application, a mobile application, and/or any combination of access applications of the same. The computing device may be a cloud client that relies on cloud computing for application delivery, or the computing device may have some functionality without access to cloud resources. For example, some applications running on the computing device may be cloud applications, i.e., applications delivered as a service over the Internet, while other applications may be stored and run on the computing device. In some embodiments, a user device may receive content from multiple cloud resources simultaneously. For example, a user device can stream audio from one cloud resource while downloading content from a second cloud resource. Or a user device can download content from multiple cloud resources for more efficient downloading. In some embodiments, computing devices can use cloud resources for processing operations such as the processing operations performed by processing circuitry described in relation to FIG. 3.

In various embodiments, one or more media asset databases 330 may be stored in whole or in part in storage 308, storage 330, and/or cloud storage 330. Media asset database 330 stores media assets, media asset metadata, media asset fingerprints, and/or the like, which are utilized in accordance with the procedures herein. Media asset database 330 may also include one or more types of content distribution equipment including a television distribution facility, cable system headend, satellite distribution facility, programming sources (e.g., television broadcasters, such as NBC, ABC, HBO, etc.), intermediate distribution facilities and/or servers, Internet providers, on-demand media servers, and other content providers. NBC is a trademark owned by the National Broadcasting Company, Inc., ABC is a trademark owned by the American Broadcasting Company, Inc., and HBO is a trademark owned by the Home Box Office, Inc. Media asset database 330 may be the originator of content (e.g., a television broadcaster, a Webcast provider, etc.) or may not be the originator of content (e.g., an on-demand content provider, an Internet provider of content of broadcast programs for downloading, etc.). Media asset database 330 may include cable sources, satellite providers, on-demand providers, Internet providers, over-the-top content providers, or other providers of content. Media asset database 330 may also include a remote media server used to store different types of content (including video content selected by a user), in a location remote from any of the computing devices. Systems and methods for remote storage of content and providing remotely stored content to user equipment are discussed in greater detail in connection with Ellis et al., U.S. Pat. No. 7,761,892, issued Jul. 20, 2010, which is hereby incorporated by reference herein in its entirety.

Control circuitry 304, 322 may include video generating circuitry and tuning circuitry, such as one or more analog tuners, one or more MPEG-2 decoders or other digital decoding circuitry, high-definition tuners, or any other suitable tuning or video circuits or combinations of such circuits. Encoding circuitry (e.g., for converting over-the-air, analog, or digital signals to MPEG signals for storage) may also be provided. Control circuitry 304, 322 may also include scaler circuitry for upconverting and downconverting content into the preferred output format of the computing device 202. Circuitry 304, 322 may also include digital-to-analog converter circuitry and analog-to-digital converter circuitry for converting between digital and analog signals. The tuning and encoding circuitry may be used by the computing device to receive and to display, to play, or to record content. The circuitry described herein, including for example, the tuning, video generating, encoding, decoding, encrypting, decrypting, scaler, and analog/digital circuitry, may be implemented using software running on one or more general purpose or specialized processors. Multiple tuners may be provided to handle simultaneous tuning functions (e.g., watch and record functions, picture-in-picture (PIP) functions, multiple-tuner recording, etc.). If storage 308 is provided as a separate device from computing device 202, the tuning and encoding circuitry (including multiple tuners) may be associated with storage 308.

A user may send instructions to control circuitry 304, 322 using user input interface 310. User input interface 310 may be any suitable user interface, such as a remote control, mouse, trackball, keypad, keyboard, touch screen, touchpad, stylus input, joystick, voice recognition interface, or other user input interfaces. Display 312 may be provided as a stand-alone device or integrated with other elements of each one of computing device 202 and server 204. For example, display 312 may be a touchscreen or touch-sensitive display. In such circumstances, user input interface 310 may be integrated with or combined with display 312. Display 312 may be one or more of a monitor, a television, a liquid crystal display (LCD) for a mobile device, amorphous silicon display, low temperature poly silicon display, electronic ink display, electrophoretic display, active matrix display, electro-wetting display, electrofluidic display, cathode ray tube display, light-emitting diode display, electroluminescent display, plasma display panel, high-performance addressing display, thin-film transistor display, organic light-emitting diode display, surface-conduction electron-emitter display (SED), laser television, carbon nanotubes, quantum dot display, interferometric modulator display, or any other suitable equipment for displaying visual images. In some embodiments, display 312 may be HDTV-capable. In some embodiments, display 312 may be a 3D display, and the interactive application and any suitable content may be displayed in 3D. A video card or graphics card may generate the output to the display 312. The video card may offer various functions such as accelerated rendering of 3D scenes and 2D graphics, MPEG-2/MPEG-4 decoding, TV output, or the ability to connect multiple monitors. The video card may be any processing circuitry described above in relation to control circuitry 304. The video card may be integrated with the control circuitry 304. Speakers 314 may be provided as integrated with other elements of each one of computing device 202 and server 204 or may be stand-alone units. The audio component of videos and other content displayed on display 312 may be played through speakers 314. In some embodiments, the audio may be distributed to a receiver (not shown), which processes and outputs the audio via speakers 314.

Figure 4:
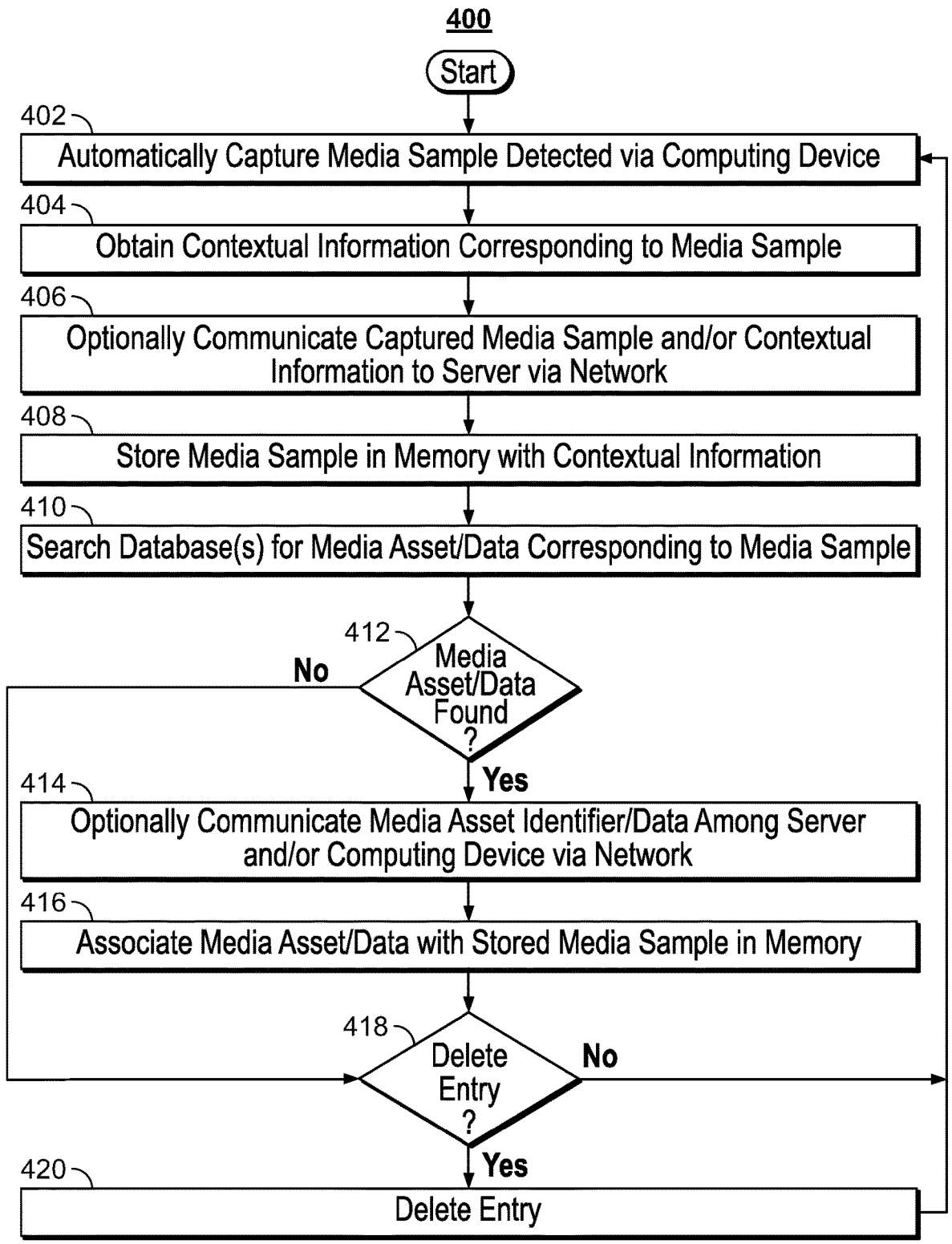
FIG. 4 depicts an illustrative flowchart of a process for generating a database for facilitating contextual queries, in accordance with some embodiments of the disclosure.

FIG. 4 depicts an illustrative flowchart of a process 400 for generating a database for facilitating contextual queries, in accordance with some embodiments of the disclosure. As one of skill in the art will appreciate, various steps of the procedure 400, as well as the other procedures herein, may be implemented by the computing device 202, the server(s) 204, the cloud storage 206, and/or any combination thereof. At block 402, control circuitry 304 automatically captures, without requiring user input, a media sample 214 from the environment surrounding the computing device 202. For example, control circuitry 304 may capture an audio sample 214 by way of microphone 316, and/or a video sample or image sample by way of camera 318. Additional details regarding how control circuitry 304 may capture media sample 214 are provided in the context of FIG. 5.

At block 404, control circuitry 304 and/or control circuitry 322 obtains contextual information corresponding to the media sample 214 that was captured at block 402. The contextual information indicates a context in which control circuitry 304 of computing device 202 captured the media sample 214. For example, the contextual information may include a time identifier that indicates a time at which (or time window within which) the media sample 214 was captured, a location identifier that indicates a location at which (or location range within which) the media sample 214 was captured, an activity identifier that indicates an activity (e.g., traveling in a taxi or on a train, eating at a restaurant, and/or the like) that was underway during capture of the media sample 214, an identifier of a second computing device indicating an acquaintance who was present during capture of the media sample 214, and/or the like. Additional details regarding example types of contextual information and how contextual information may be obtained at block 404 are provided in the context of FIG. 6, FIG. 7, FIG. 8, FIG. 9, and FIG. 10. As one of skill in the art will appreciate, in various embodiments the different types of contextual information described in FIG. 6, FIG. 7, FIG. 8, FIG. 9, and FIG. 10 (e.g., time information, location information, activity information, associated device information, and/or the like) may be employed individually or in any combination.

In some embodiments, where the one or more server(s) 204 are configured to store and/or process the captured media sample 214, at block 406, control circuitry 202 communicates the media sample 214 that was captured at block 402, and/or an identifier of the media sample 214, to server(s) 204 by way of I/O path 302, communication network 208, and I/O path 320. At block 408, control circuitry 304 stores the captured media sample 214 and/or the identifier of the media sample, in a memory such as storage 308, indexed by the contextual information. Although in some examples the captured media sample itself is stored at block 408, in other examples the identifier of the captured media sample is stored instead of the captured media sample itself. In various aspects, the captured media sample 214, the media sample identifier, and/or the contextual information may be stored in the same memory or in separate memories (e.g., storage 308, storage 326, and/or cloud storage 206). Additionally or alternatively, for example, to avoid overutilizing local storage 308 and/or local processing circuitry 306, control circuitry 304 communicates the media sample 214 and/or media sample identifier to cloud storage 206 and/or to server storage 326 over communication network 208 for remote storing and/or processing.

Figure 5:
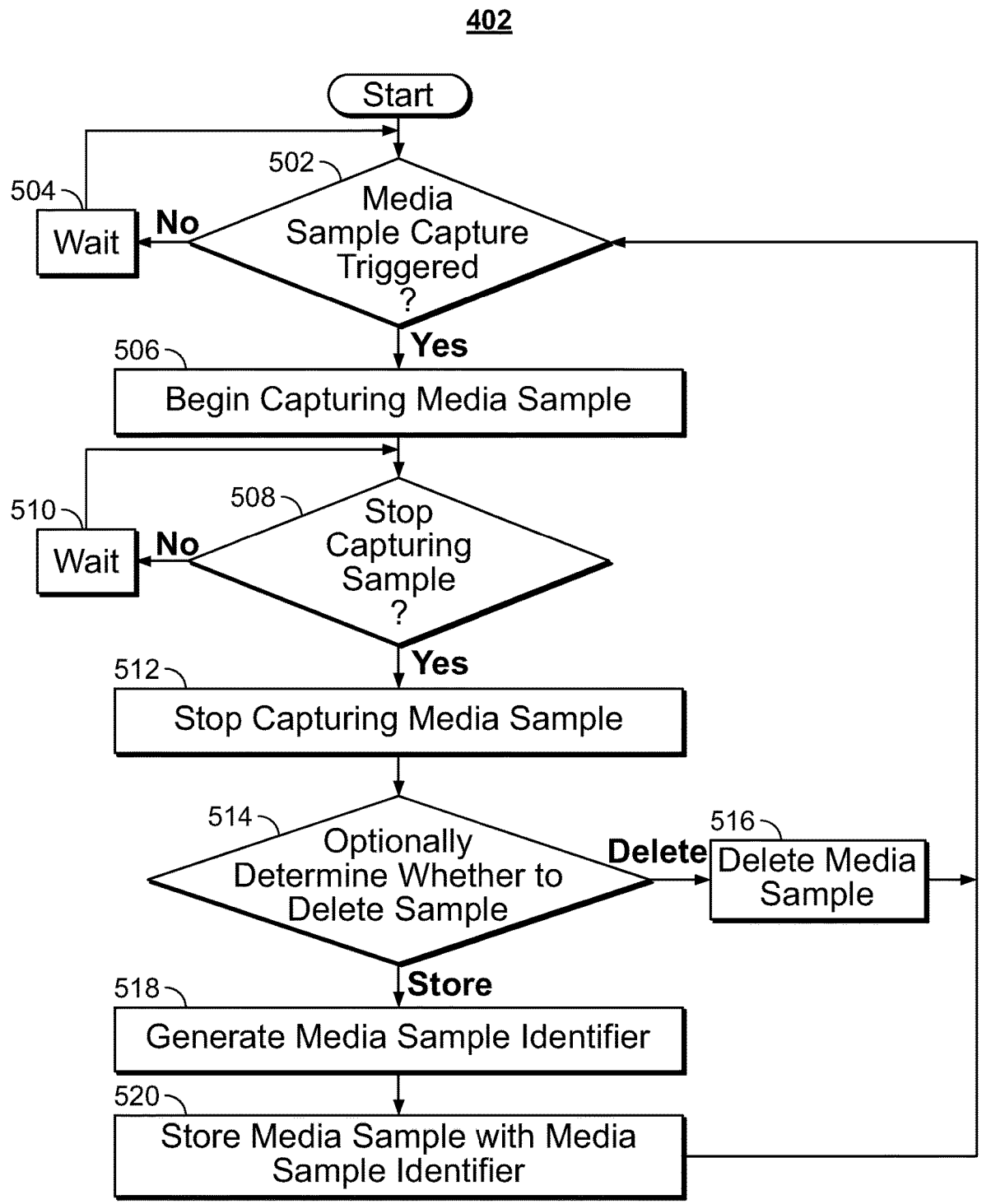
FIG. 5 depicts an illustrative flowchart of a process for automatically capturing media samples via a computer device, in accordance with some embodiments.

In some embodiments, and as described in further detail in the context of FIG. 5, the storing of the media sample 214 and/or media sample identifier at block 408 is repeated periodically or in response to computing device 202 detecting a trigger event. In this manner, the media sample 214 and/or media sample identifier stored at block 408 represents one entry of a database, having multiple entries of media samples and/or related information, that is generated and maintained to facilitate responses to contextual queries relating to the media samples. Additional details regarding an illustrative database of media sample entries are provided in the context of FIG. 6.

At block 410, control circuitry 304 and/or control circuitry 322 search one or more media asset databases 330 (e.g., which may be included within storage 308, storage 326, and/or cloud storage 206) for a media asset and/or other data that relates to the media sample 214 captured at block 402. Additional details regarding how control circuitry 304 and/or control circuitry 322 may perform, at block 410, the database search for the related media asset and/or other data are provided in the context of FIG. 11.

At block 412, control circuitry 304 and/or control circuitry 322 determines a next step in process 400 to be executed based on a returned result of the database search conducted at block 410 indicating whether the search turned up any media asset and/or other data that relates to the captured media sample 214. If the database search did not yield any media asset and/or other data that relates to the captured media sample 214 ("NO" at block 412), then control passes to block 418 described below. If the database search does yield a media asset and/or other data that relates to the captured media sample 214 ("YES" at block 412), then control passes to block 414.

In some embodiments, where the one or more server(s) 204 are configured to store and/or process the media asset or other data obtained from the database search conducted at block 410, at block 414, control circuitry 202 communicates the media asset or other data obtained from the database search, to server(s) 204 by way of I/O path 302, communication network 208, and I/O path 320. At block 416, control circuitry 304 stores the media asset or other data obtained from the database search at block 410 in storage 308 in association with the media sample 214 and/or media sample identifier stored at block 408. Additionally or alternatively, for example, to avoid overutilizing local storage 308 and/or local processing circuitry 306, control circuitry 304 communicates the media asset or other data obtained from the database search at block 410 to cloud storage 206 and/or to server storage 326 over communication network 208 for remote storing and/or processing.

At block 418, control circuitry 304 and/or control circuitry 322 determine whether to delete the media sample 214 entry created when the media sample 214 and/or media sample identifier was stored at block 408. In one example, control circuitry 304 and/or control circuitry 322 may be configured (e.g., based on a software setting) to delete the entry if the database search at block 412 did not yield any media asset and/or other data that relates to the captured media sample 214, to conserve storage space, for instance. In another example, control circuitry 304 and/or control circuitry 322 may be configured to continue to store the entry even if the database search at block 412 did not yield any media asset and/or other data that relates to the captured media sample 214, to facilitate playback of the media sample. If control circuitry 304 and/or control circuitry 322 are configured to delete the entry if the database search at block 412 did not yield any media asset and/or other data that relates to the captured media sample 214, then, if control was passed from block 412 directly to block 418, control circuitry 304 and/or control circuitry 322 determine that the entry should be deleted ("YES" at block 418) and control is passed to block 420 at which the entry is deleted. If control circuitry 304 and/or control circuitry 322 are configured to keep the entry even if the database search at block 412 did not yield any media asset and/or other data that relates to the captured media sample 214, then, if control was passed from block 412 directly to block 418, control circuitry 304 and/or control circuitry 322 determine that the entry should not be deleted ("NO" at block 418) and control is passed back to block 402 to capture another media sample in the manner described above.

In some embodiments, control circuitry 304 and/or control circuitry 322 are configured to delete the entry after a certain expiration period has passed, for example, to conserve storage space. For instance, when creating the entry by storing the media sample at block 408, control circuitry 304 and/or control circuitry 322 may also store an expiration date and/or time. Then, if control was passed to block 418 by way of block 416 (as opposed to directly from block 412), control circuitry 304 and/or control circuitry 322 read the expiration date and/or time in the memory to determine whether the entry has expired and should be deleted. If control circuitry 304 and/or control circuitry 322 determine that the entry is expired and should be deleted ("YES" at block 418), then control passes to block 420 at which the entry is deleted. If control circuitry 304 and/or control circuitry 322 determine that the entry has not expired should not be deleted ("NO" at block 418), then control passes back to block 402 to capture another media sample in the manner described above.

FIG. 5 depicts an illustrative flowchart of process 402, showing additional details regarding how control circuitry 304 may automatically capture media sample 214 at block 402 (FIG. 4), in accordance with some embodiments. At block 502, control circuitry 304 determines whether a media sample capture is triggered. In some aspects, control circuitry 304 is configured to sequentially capture media samples according to a predetermined (or configurable) time period. Accordingly, in such a case, capture of a media asset may be triggered at the start of each new time period. Additionally or alternatively, control circuitry 304 may be configured to capture media assets in response to detection of another type of trigger event, such as a sound level above a certain sound pressure level (e.g., in decibels) being captured via microphone 316. If control circuitry 304 determines that a media sample capture is not triggered ("NO" at block 502), then control passes to block 504, at which— control circuitry 304 waits for some period of time, after which control passes back to block 502 to repeat the trigger determination process. If, on the other hand, control circuitry 304 determines that a media sample capture is triggered ("YES" at block 502), then control passes to block 506.

At block 506, control circuitry 304 begins capturing media sample 214. For example, control circuitry 304 begins to store in storage 308 an audio sample received by way of microphone 316 or begins to store in storage 308 an image sample or video sample received by way of camera 318. At block 508, control circuitry 304 determines whether to stop capturing media sample 214. For instance, in some aspects, control circuitry 304 may be configured to capture media samples of a certain size and/or duration. The size and/or duration may vary based on media sample type, for example, to ensure a media sample size large enough to enable identification of the media sample. Additionally or alternatively, control circuitry 304 may be configured to capture media samples as long as a trigger condition remains detected (e.g., as long as a sound level above a certain sound pressure level (e.g., in decibels) remains continuously captured via microphone 316). If control circuitry 304 determines not to stop capturing media sample 214 ("NO" at block 508), then control passes to block 510, at which control circuitry 304 waits for some period of time, after which control passes back to block 508 to repeat the capture ending determination process. If, on the other hand, control circuitry 304 determines to stop capturing media sample 214 ("YES" at block 508), then control passes to block 512 at which control circuitry 304 ceases the capturing of media sample 214.

In some aspects, control circuitry 304 determines at block 514 whether to delete the captured media sample 214. For example, control circuitry 304 may be configured to process the captured media sample 214 (e.g., as described in the context of FIG. 11) to determine whether the media sample 214 corresponds to some media asset (e.g., a song, a movie, an image, a voice command, and/or the like) and delete the media sample 214 if it does not correspond to some media asset. Alternatively, control circuitry 304 may be configured to communicate the captured media sample 214 to control circuitry 322 for such processing and/or storage to facilitate later processing. In this manner, storage utilization may be conserved by only storing media samples that correspond to media assets and deleting other media samples. If control circuitry 304 determines to delete the captured media sample 214 ("DELETE" at block 514), then control passes to block 516, at which control circuitry 304 and/or 322 delete the captured media sample 214. If, on the other hand, control circuitry 304 determines not to delete the captured media sample 214 ("STORE" at block 514), then control passes to block 518.

At block 518, control circuitry 304 generates a media sample identifier unique to the captured media sample 214, and at block 520, control circuitry 304 stores the media sample identifier and/or the media sample 214 in storage 308. Additionally or alternatively, control circuitry 304 may communicate the media sample 214 and/or media sample identifier to cloud storage 206 and/or to server storage 326 over communication network 208 for remote storing and/or processing. Following block 520, control passes back to block 502 to determine whether capture of another media sample is triggered in the manner described above.

FIG. 6 shows example entries of a database 600 for facilitating contextual queries, such as the database that may be generated according to the process 400 of FIG. 4, in accordance with some aspects herein. Among other things, FIG. 6 illustrates example types of contextual information, and FIG. 7, FIG. 8, FIG. 9, and FIG. 10 illustrate example processes of obtaining at block 404 (FIG. 4) different types of contextual information, such as time information (FIG. 7), location information (FIG. 8), activity information (FIG. 9), associated device information (FIG. 10), and/or the like. The database 600 includes entries 630-1 through 630-8 (collectively 630), each of which corresponding to a media sample (e.g., media sample 214) that was captured during an iteration of block 402 of FIG. 4. Each of the entries 630 includes a number of fields in which data is stored in association with the respective captured media samples. Although FIG. 6 shows particular fields, it should be understood that the particular fields shown in FIG. 6 are provided by way of example and not limitation. Certain of the fields shown in FIG. 6 may be omitted in some aspects. In the example of FIG. 6, each of the entries in 630 includes a media sample identifier field 602, a media sample fingerprint field 604, a capturing device identifier field 606, a time identifier field 608, a location identifier field 610, an activity identifier field 612, an associated device identifier field 614, a media sample link field 616, a media asset identifier field 618, media asset metadata fields 620 (including a title field 620-1, an album field 620-2, and an artist field 620-3), a media asset link field 622, a media asset fingerprint field 624, an event identifier field 626, and an expiration date/time field 628. Each of the fields of the entries 630 stores a particular type of data, as described elsewhere herein.

Figure 7:
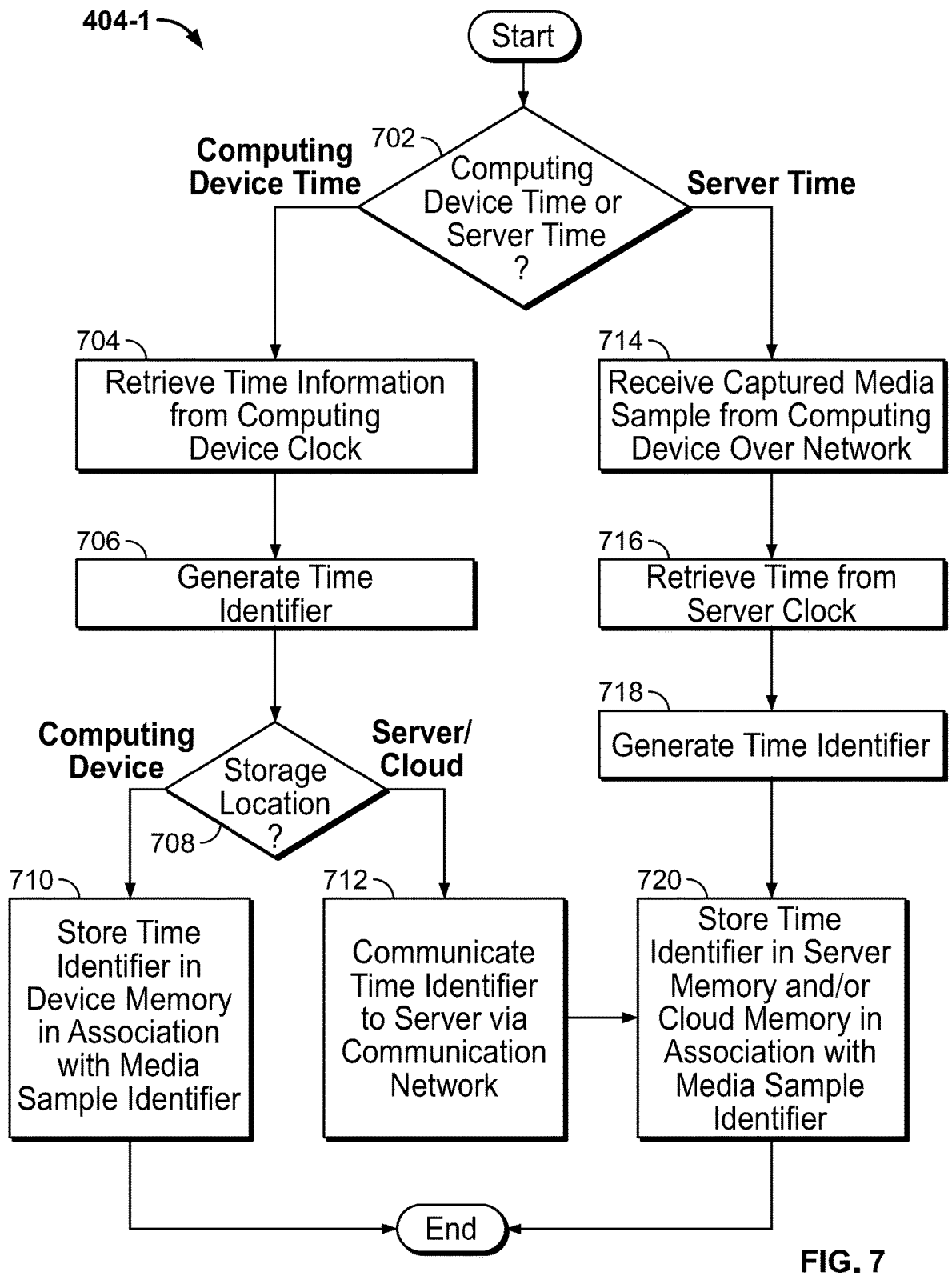
FIG. 7 depicts an illustrative flowchart of a process for obtaining a time identifier corresponding to a captured media sample, in accordance with some embodiments of the disclosure.

FIG. 7 includes a flowchart of an illustrative process 404-1, showing additional details regarding how control circuitry 304 and/or control circuitry 322 may obtain contextual information at block 404 (FIG. 4), in accordance with some embodiments. In particular, in the example of process 404-1, the contextual information includes time information associated with the capturing of the media asset 214 at block 402 (FIG. 4), such as information indicating a time during which computing device 202 was capturing media sample 214. In various aspects, computing device 202 (e.g., control circuitry 304) and/or server(s) 204 (e.g., control circuitry 322) may be configured to generate the time information in process 404-1. If computing device 202 (e.g., control circuitry 304) is configured to generate the time information ("COMPUTING DEVICE TIME" at block 702), then control passes to block 704. If one or more of server(s) 204 (e.g., control circuitry 322) are configured to generate the time information ("SERVER TIME" at block 702), then control passes to block 714.

Before continuing describing block 704, reference will briefly be made to FIG. 4. Although FIG. 4 shows that contextual information is obtained at block 404 after media sample 214 is captured at block 402, in some aspects the contextual information may be obtained at block 404 concurrently with the capturing of the media sample 214. For instance, with reference to FIG. 5, control circuitry 304 may be configured to capture and store in storage 308 contextual information (e.g., a start time, indicated by clock 328, at which capturing of media sample 214 began) when capture of media sample 214 begins at block 506 and may capture and store in storage 308 contextual information (e.g., an end time, indicated by clock 328, at which capturing of media sample 214 ceased) when capture of media sample 214 stops at block 512. Referring back to block 704, control circuitry 304 retrieves time information associated with the captured media sample 214. For example, control circuitry 304 may retrieve the time information from clock 328 of the computing device 202 (e.g., indicating a current time during or shortly after capture of media sample 214 at block 402 (FIG. 4)) and/or from storage 308 (e.g., stored at block 506 and/or block 512 in the manner described above). At block 706, control circuitry 304 generates a time identifier based on the time information retrieved at block 704. The time identifier generated at block 706 may be a copy of the time information retrieved at block 704 or may be derived from the time information retrieved at block 704. For instance, the time identifier may include a start time, an end time, and/or a time window corresponding to capture of the media sample 214 at block 402.

At block 708, control circuitry 304 determines whether the time identifier generated at block 706 is to be stored locally in storage 308 of computing device 202 or remotely in storage 326 of server 204 and/or cloud storage 206. If the time identifier is to be stored locally ("COMPUTING DEVICE" at block 708), then control passes to block 710, at which control circuitry 304 stores the time identifier in storage 308 in association with the media sample identifier 602 of media sample 214, for example, under the time identifier field 608 for entry 630-1 (FIG. 6). If the time identifier is to be stored remotely ("SERVER/CLOUD" at block 708), then control passes to block 712, at which control circuitry 304 communicates the time identifier to server 204 and/or cloud storage 206 via communication network 208 for storage at block 720 (described below).

If control was passed from block 702 to block 714 ("SERVER TIME" at block 702), then at block 714 control circuitry 322 receives the captured media sample 214 and/or the corresponding media sample identifier from computing device 202 over communication network 208. At block 716, control circuitry 322 retrieves time information from clock 332 of the server 204 (e.g., indicating a current time at which control circuitry 322 received the captured media sample 214 and/or media sample identifier at block 714. At block 718, control circuitry 322 generates a time identifier based on the time information retrieved at block 716. The time identifier generated at block 718 may be a copy of the time information retrieved at block 716, or may be derived from the time information retrieved at block 716. For instance, control circuitry 322 may generate, as the time identifier based on the time information retrieved at block 716, a start time, an end time, and/or a time window corresponding to capture of the media sample 214 at block 402. If control was passed to block 720 by way of block 718, then at block 720, control circuitry 322 stores in storage 326 and/or cloud storage 206, the time identifier generated at block 718. If control was passed to block 720 by way of block 712, then at block 720, control circuitry 322 stores in storage 326 and/or cloud storage 206, the time identifier communicated to server 204 at block 712.

Figure 8:
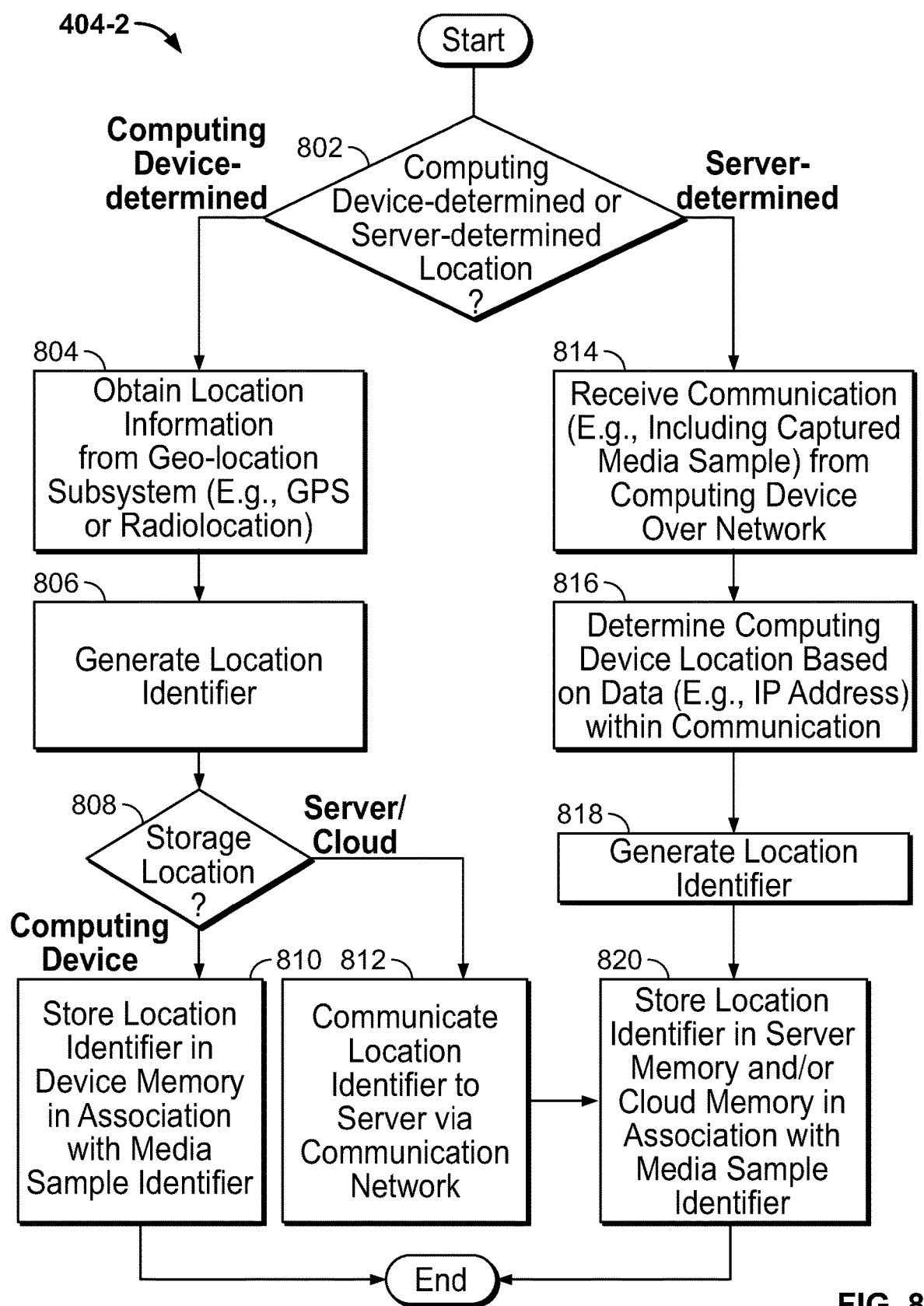
FIG. 8 shows an example flowchart of a process for obtaining a location identifier corresponding to a captured media sample, in accordance with some embodiments of the disclosure.

FIG. 8 includes a flowchart of another illustrative process 404-2, showing additional details regarding how control circuitry 304 and/or control circuitry 322 may obtain contextual information at block 404 (FIG. 4), in accordance with some embodiments. In particular, in process 404-2, the contextual information includes location information associated with the capturing of the media asset 214 at block 402 (FIG. 4), such as information indicating a location of the computing device 202 while computing device 202 was capturing media sample 214 at block 402. In various aspects, computing device 202 (e.g., control circuitry 304) and/or server(s) 204 (e.g., control circuitry 322) may be configured to generate the location information in process 404-2. If computing device 202 (e.g., control circuitry 304) is configured to generate the location information ("COMPUTING-DEVICE-DETERMINED" at block 802), then control passes to block 804. If one or more of server(s) 204 (e.g., control circuitry 322) are configured to generate the location information ("SERVER-DETERMINED" at block 802), then control passes to block 814.

At block 804, control circuitry 304 obtains location information associated with the captured media sample 214. For example, control circuitry 304 may obtain the location information from geo-location subsystem 334 working in conjunction with a geo-location system, such as satellites 210 (e.g., based on a global positioning system, such as GPS) and/or radiolocation transceivers 212, of system 200 (FIG. 2, FIG. 3). The location information indicates a location or range of locations of computing device 202 during or shortly after capture of media sample 214 at block 402 (FIG. 4). In some examples, if location information is stored at block 506 and/or block 512 in the manner described above, control circuitry 304 may retrieve the location information from storage 308 at block 804. At block 806, control circuitry 304 generates a location identifier based on the location information retrieved at block 804. The location identifier generated at block 806 may be a copy of the location information obtained at block 804 or may be derived from the location information retrieved at block 804. For instance, the location identifier may include a start location, an end location, and/or a range of locations of computing device 202 during capture of media sample 214 at block 402.

At block 808, control circuitry 304 determines whether the location identifier generated at block 806 is to be stored locally in storage 308 of computing device 202 or remotely in storage 326 of server 204 and/or cloud storage 206. If the location identifier is to be stored locally ("COMPUTING DEVICE" at block 808), then control passes to block 810, at which control circuitry 304 stores the location identifier in storage 308 in association with the media sample identifier 602 of media sample 214, for example, under the location identifier field 610 for entry 630-1 (FIG. 6). If the location identifier is to be stored remotely ("SERVER/CLOUD" at block 808), then control passes to block 812, at which control circuitry 304 communicates the location identifier to server 204 and/or cloud storage 206 via communication network 208 for storage at block 820 (described below).

If control was passed from block 802 to block 814 ("SERVER-DETERMINED" at block 802), then at block 814 control circuitry 322 receives a communication (e.g., including the captured media sample 214 and/or the corresponding media sample identifier) from computing device 202 over communication network 208. At block 816, control circuitry 322 determines a location of computing device 202 at or near a time when computing device 202 captured media sample 214. For example, control circuitry 322 may determine computing device 202 location based on data (e.g., an IP address) included in the communication received at block 814. At block 818, control circuitry 322 generates a location identifier based on the location determined at block 818. The location identifier generated at block 818 may include a location of computing device 202 when it began capturing media sample 214, when it ceased capturing media sample 214, and/or at some time in between the beginning and end of media sample 214 capture at block 402. If control was passed to block 820 by way of block 818, then at block 820, control circuitry 322 stores in storage 326 and/or cloud storage 206, the location identifier generated at block 818. If, on the other hand, control was passed to block 820 by way of block 812, then at block 820, control circuitry 322 stores in storage 326 and/or cloud storage 206, the location identifier communicated to server 204 at block 812.

Figure 9:
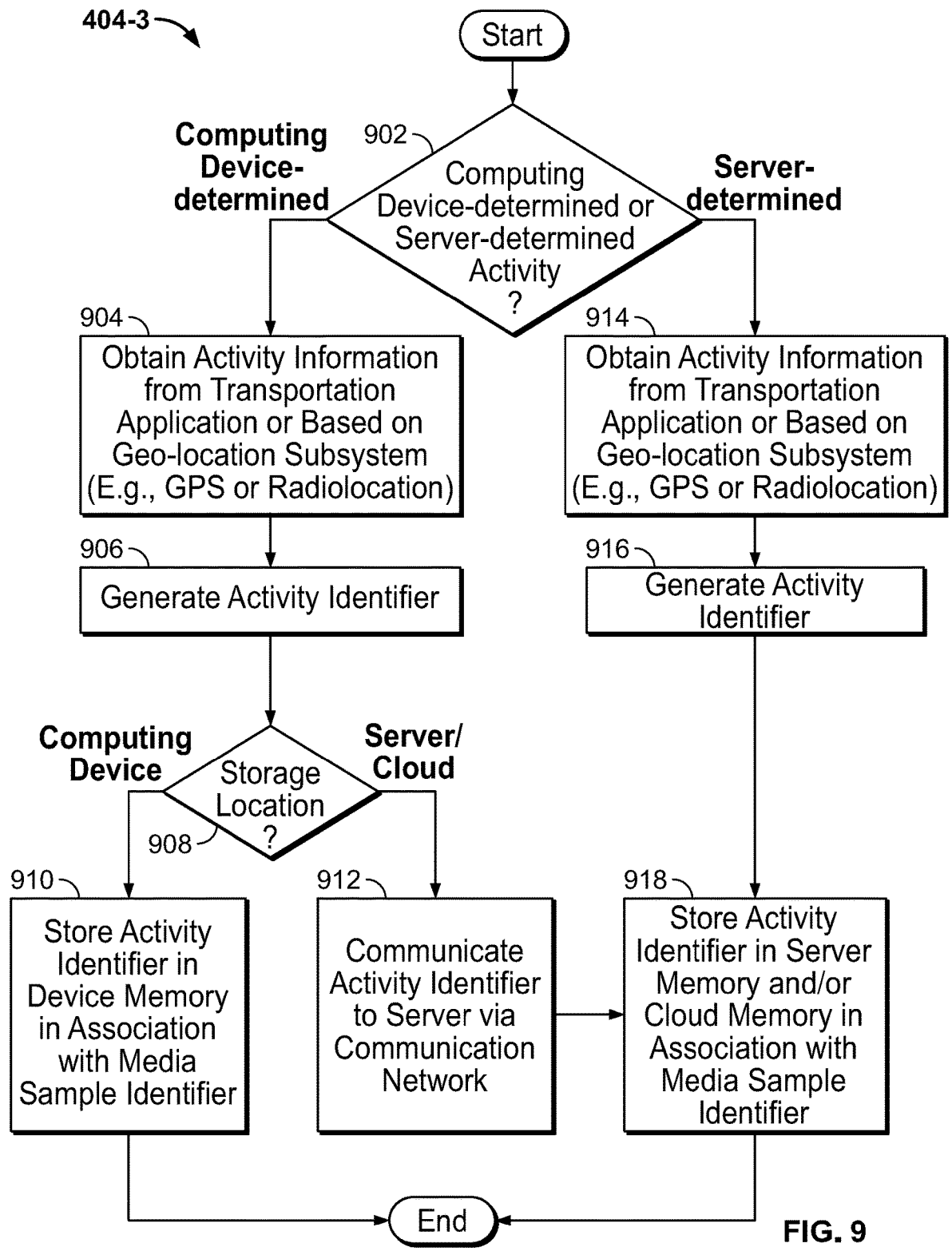
FIG. 9 depicts an illustrative flowchart of a process for obtaining an activity identifier corresponding to a captured media sample, in accordance with some aspects of the disclosure.

FIG. 9 includes a flowchart of another illustrative process 404-3, showing additional details regarding how control circuitry 304 and/or control circuitry 322 may obtain contextual information at block 404 (FIG. 4), in accordance with some embodiments. In particular, in process 404-3, the contextual information includes activity information associated with the capturing of the media asset 214 at block 402 (FIG. 4), such as information indicating an activity that a carrier of the computing device 202 was engaging in while computing device 202 was capturing media sample 214 at block 402. In various aspects, computing device 202 (e.g., control circuitry 304) and/or server(s) 204 (e.g., control circuitry 322) may be configured to generate the activity information in process 404-3. If computing device 202 (e.g., control circuitry 304) is configured to generate the location information ("COMPUTING-DEVICE-DETERMINED" at block 902), then control passes to block 904. If one or more of server(s) 204 (e.g., control circuitry 322) are configured to generate the activity information ("SERVER-DETERMINED" at block 902), then control passes to block 914.

At block 904, control circuitry 304 obtains activity information associated with the captured media sample 214. For example, control circuitry 304 may obtain the activity information based on location information obtained from geo-location subsystem 334 working in conjunction with a geo-location system, such as satellites 210 (e.g., based on a global positioning system, such as GPS) and/or radiolocation transceivers 212, of system 200 (FIG. 2, FIG. 3). For example, the location information may indicate a location or range of locations of computing device 202 during or shortly after capture of media sample 214 at block 402 (FIG. 4). Control circuitry 304 may be configured to determine an activity that the person carrying computing device 202 was engaging in based on the location information. For instance, control circuitry 304 may be configured to determine whether the person was traveling in an automobile, on a train, and/or the like by cross-referencing the location of computing device 202 over time with a geographical software map including roadways, transit paths, and/or the like. Additionally or alternatively, control circuitry 304 may be configured to determine that the person was eating in a restaurant by cross-referencing the location of computing device 202 over time with a geographical software map including restaurant locations. Control circuitry 304 may further be configured to determine that the person was eating lunch at the restaurant based on a search of the time (e.g., as determined above in the context of FIG. 7) during which the computing device 202 was present in the restaurant. For instance, if the computing device 202 was present in the restaurant within a range of morning hours, control circuitry 304 may conclude that the person was eating breakfast at that time. If the computing device 202 was present in the restaurant within a range of midday hours, control circuitry 304 may conclude that the person was eating lunch at that time. If the computing device 202 was present in the restaurant within a range of evening hours, control circuitry 304 may conclude that the person was eating dinner at that time. As another example, at block 904 control circuitry 304 may obtain the activity information from a transportation application, such as a ride-sharing application installed on computing device 202, indicating that the person was in transit in a taxi during capture of the media sample 214.

In some aspects, if contextual information (particularly activity information) was stored in the manner described above at block 506 and/or block 512, during capturing of media sample 214, then at block 904 control circuitry 304 may retrieve the activity information from storage 308. At block 906, control circuitry 304 generates an activity identifier based on the activity information obtained at block 904. The activity identifier generated at block 906 may be a copy of the activity information obtained at block 904 or may be derived from the activity information obtained at block 904. For instance, the activity identifier may include an activity start time or location, an activity end time or location, and/or a range of times or locations of computing device 202 during which the activity was ongoing and media sample 214 was being captured at block 402.

At block 908, control circuitry 304 determines whether the activity identifier generated at block 906 is to be stored locally in storage 308 of computing device 202 or remotely in storage 326 of server 204 and/or cloud storage 206. If the activity identifier is to be stored locally ("COMPUTING DEVICE" at block 908), then control passes to block 910, at which control circuitry 304 stores the activity identifier in storage 308 in association with the media sample identifier 602 of media sample 214, for example, under the activity identifier field 612 for entry 630-1 (FIG. 6). If the activity identifier is to be stored remotely ("SERVER/CLOUD" at block 908), then control passes to block 912, at which control circuitry 304 communicates the activity identifier to server 204 and/or cloud storage 206 via communication network 208 for storage at block 918 (described below).

If control was passed from block 902 to block 914 ("SERVER-DETERMINED" at block 902), then at block 914 control circuitry 322 obtains activity information associated with the captured media sample 214 in a manner similar to that described above for control circuitry 304 in the context of block 904. At block 916, control circuitry 322 generates an activity identifier based on the activity obtained at block 914. The activity identifier generated at block 916 may include an activity the carrier of computing device 202 was engaged in when computing device 202 began capturing media sample 214, when it ceased capturing media sample 214, and/or at some time in between the beginning and end of media sample 214 capture at block 402. If control was passed to block 918 by way of block 916, then at block 918, control circuitry 322 stores in storage 326 and/or cloud storage 206, the activity identifier generated at block 916. If, on the other hand, control was passed to block 918 by way of block 912, then at block 918, control circuitry 322 stores in storage 326 and/or cloud storage 206, the activity identifier communicated to server 204 at block 912.

Figure 10:
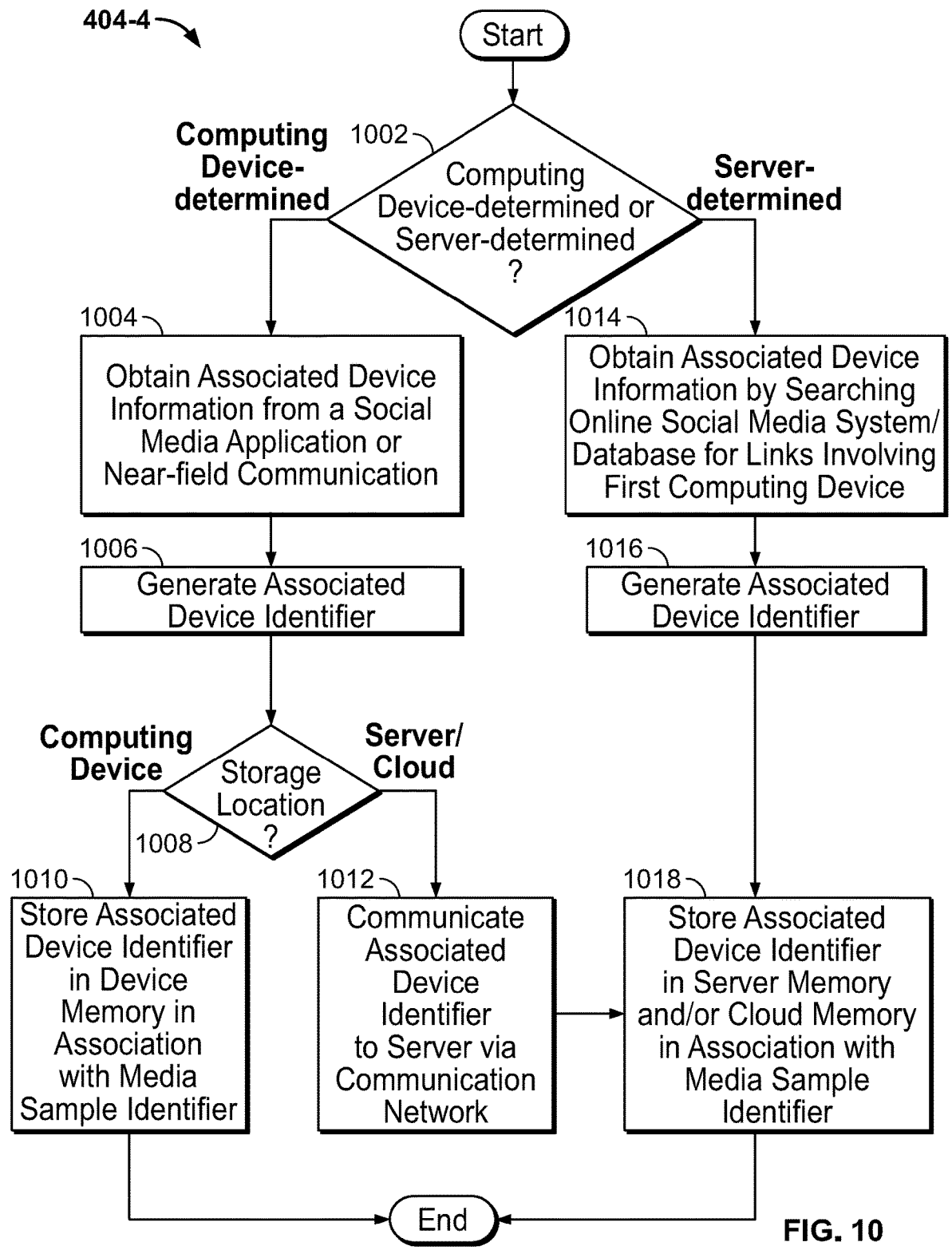
FIG. 10 is an example flowchart of a process for obtaining an identifier of a second computing device that is associated with a first computing device that has captured a media sample, in accordance with some embodiments of the disclosure.

FIG. 10 is an example flowchart of a process for obtaining an identifier of a second computing device that is associated with a first computing device that has captured a media sample, in accordance with some embodiments of the disclosure.

FIG. 10 includes a flowchart of another illustrative process 404-4, showing additional details regarding how control circuitry 304 and/or control circuitry 322 may obtain contextual information at block 404 (FIG. 4), in accordance with some embodiments. In particular, in process 404-4, the contextual information includes information regarding a computing device associated with computing device 202 which captured media sample 214 at block 402 (FIG. 4), such as information identifying a computing device of an acquaintance who was near computing device 202 during capture of the media sample 214, or who associated with computing device 202 by virtue of a social media connection, and/or the like. In various aspects, computing device 202 (e.g., control circuitry 304) and/or server(s) 204 (e.g., control circuitry 322) may be configured to generate the associated device information in process 404-4. If computing device 202 (e.g., control circuitry 304) is configured to generate the associated device information ("COMPUTING-DEVICE-DETERMINED" at block 1002), then control passes to block 1004. If one or more of server(s) 204 (e.g., control circuitry 322) are configured to generate the associated device information ("SERVER-DETERMINED" at block 1002), then control passes to block 1014.

At block 1004, control circuitry 304 obtains information about one or more computing devices that are associated with the computing device 202 that captured media sample 214. For example, control circuitry 304 may obtain the associated device information based on location information obtained from geo-location subsystem 334 working in conjunction with a geo-location system, such as satellites 210 (e.g., based on a global positioning system, such as GPS) and/or radiolocation transceivers 212, of system 200 (FIG. 2, FIG. 3). For example, the location information may indicate a location or range of locations of computing device 202 during or shortly after capture of media sample 214 at block 402 (FIG. 4). Control circuitry 322 of the server(s) 204 may be configured to separately obtain location information for multiple computing devices (including computing device 202) and then determine which, if any, other computing devices are located within a particular location range of computing device 202 at or near a time when computing device 202 was capturing media sample 214 at block 402 (FIG. 4). Additionally or alternatively, control circuitry 304 may detect a nearby computing device by way of a wireless communication subsystem (e.g., I/O path 302) of the computing device 202 and identify that nearby computing device as being in proximity with the computing device 202.

As another example, at block 1004 control circuitry 304 may obtain the associated device information from a social media system or application, which may be installed on computing device 202 or may be hosted by a server accessible via communication network 208. Control circuitry 304 may identify a social media account registered to computing device 202, then identify one or more other social media accounts linked to the social media account registered to computing device 202, and then identify, as computing devices associated with computing device 202, one or more computing devices with which those other social media accounts are registered.

In some aspects, if contextual information (particularly associated computing device information) was stored in the manner described above at block 506 and/or block 512, during capturing of media sample 214, then at block 1004 control circuitry 304 may obtain the associated device information from storage 308. At block 1006, control circuitry 304 generates an associated device identifier based on the associated device information obtained at block 1004. The associated device identifier generated at block 1006 may be a copy of the associated device information obtained at block 1004 or may be derived from that associated device information. For instance, the associated device identifier may include a social media account identifier indicating a social media account registered to the computing device determined to be associated with computing device 202.

At block 1008, control circuitry 304 determines whether the associated device identifier generated at block 1006 is to be stored locally in storage 308 of computing device 202 or remotely in storage 326 of server 204 and/or cloud storage 206. If the associated device identifier is to be stored locally ("COMPUTING DEVICE" at block 1008), then control passes to block 1010, at which control circuitry 304 stores the associated device identifier in storage 308 in association with the media sample identifier 602 of media sample 214, for example, under the associated device identifier field 614 for entry 630-1 (FIG. 6). If the associated device identifier is to be stored remotely ("SERVER/CLOUD" at block 1008), then control passes to block 1012, at which control circuitry 304 communicates the associated device identifier to server 204 and/or cloud storage 206 via communication network 208 for storage at block 1018 (described below).

If control was passed from block 1002 to block 1014 ("SERVER-DETERMINED" at block 1002), then at block 1014 control circuitry 322 obtains information about one or more computing devices that are associated with computing device 202 that captured media sample 214, in a manner similar to that described above for control circuitry 304 in the context of block 1004. At block 1016, control circuitry 322 generates an associated device identifier based on the associated device information obtained at block 1014. If control was passed to block 1018 by way of block 1016, then at block 1018, control circuitry 322 stores in storage 326 and/or cloud storage 206, the associated device identifier generated at block 1016. If, on the other hand, control was passed to block 1018 by way of block 1012, then at block 1018, control circuitry 322 stores in storage 326 and/or cloud storage 206, the associated device identifier communicated to server 204 at block 1012.

Figure 11:
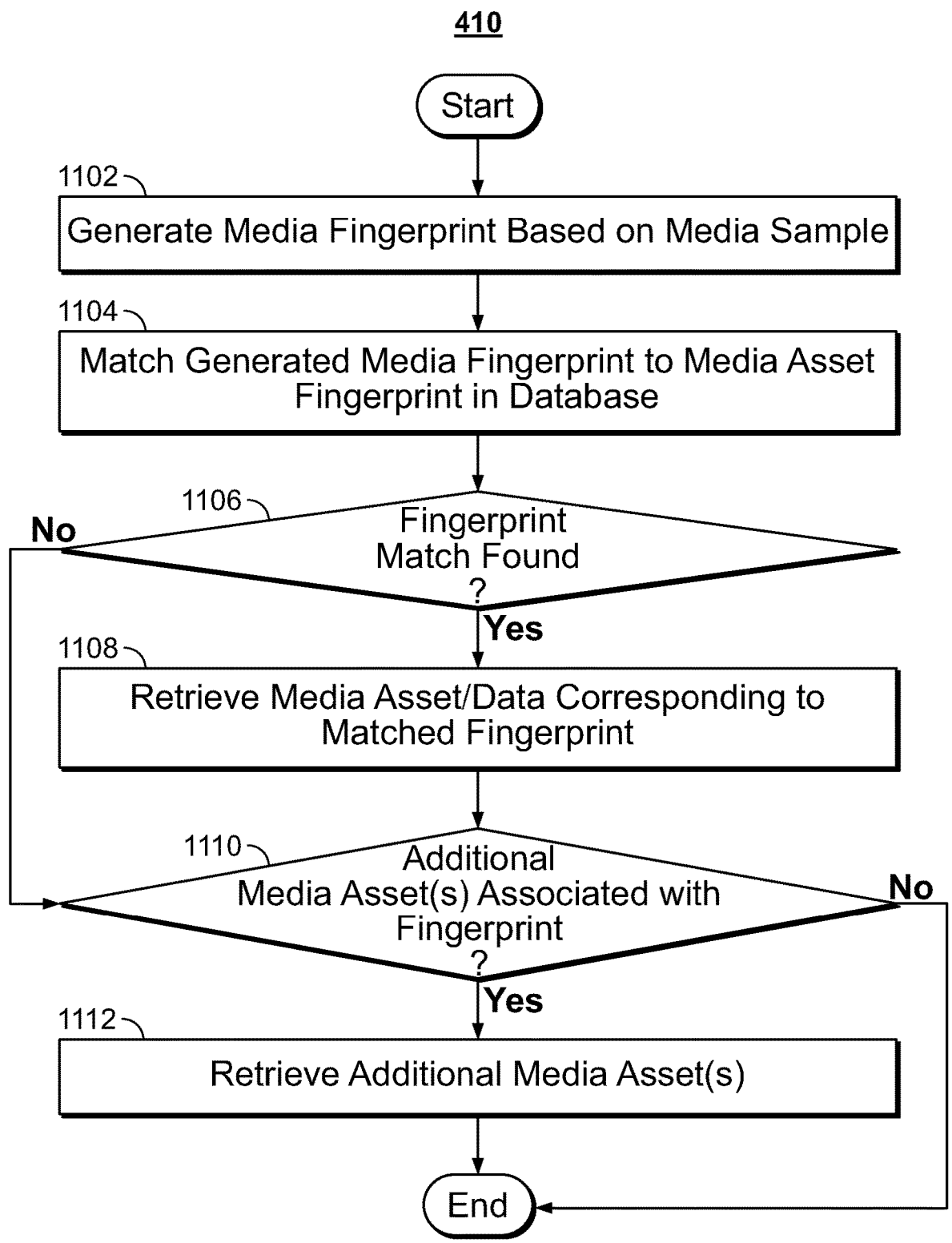
FIG. 11 depicts an illustrative flowchart of a process for identifying a media asset and/or other data that corresponds to a captured media sample, in accordance with some aspects.

FIG. 11 depicts an illustrative flowchart of process 410, showing additional details regarding how control circuitry 304 and/or control circuitry 322 may search, at block 410 (FIG. 4), the media asset database 330 for the related media asset and/or other data. At block 1102, control circuitry 304 and/or control circuitry 322 generates a media fingerprint according to known processes based on the media sample 1102 captured at block 402 of FIG. 4. At block 1104, control circuitry 304 and/or control circuitry 322 search media asset database 330, which may reside in storage 308, in storage 326, and/or in cloud storage 206, for a media fingerprint that matches the fingerprint generated at block 1102. If a match is found ("YES" at block 1106), then control passes to block 1108. If a match is not found ("NO" at block 1108), then control passes to block 1110. At block 1108, control circuitry 304 and/or control circuitry 322 retrieve from the media asset database 330 a digital copy of the media asset that corresponds to the matched media fingerprint, metadata of that media asset, and/or the like.

In some aspects, at block 1110, control circuitry 304 and/or control circuitry 322 determine whether any additional media assets are associated with the media fingerprint generated at block 1102. For example, if the media sample captured at block 402 (FIG. 4) is an audio sample, and the media fingerprint generated at block 1102 is an audio fingerprint based on the audio sample, control circuitry 304 and/or control circuitry 322 may identify, in the database, an association between the audio fingerprint and a video media asset and may determine that the captured audio sample is associated with the video media asset. In this manner, for instance, if the computing device 202 captures an audio portion of a movie that is playing nearby, the computing device 202 may identify the movie based on the identified audio portion. If control circuitry 304 and/or control circuitry 322 determine that another media asset is associated with the media fingerprint generated at block 1102 ("YES" at block 1110), then control passes to block 1112, at which control circuitry 304 and/or control circuitry 322 retrieve from the media asset database 330 the additional media asset (e.g., a digital copy of the media asset, metadata of that media asset, and/or the like). Following block 1112, or if control circuitry 304 and/or control circuitry 322 determine that no other media asset is associated with the media fingerprint generated at block 1102 ("NO" at block 1110), then the process 410 terminates.

Figure 12:
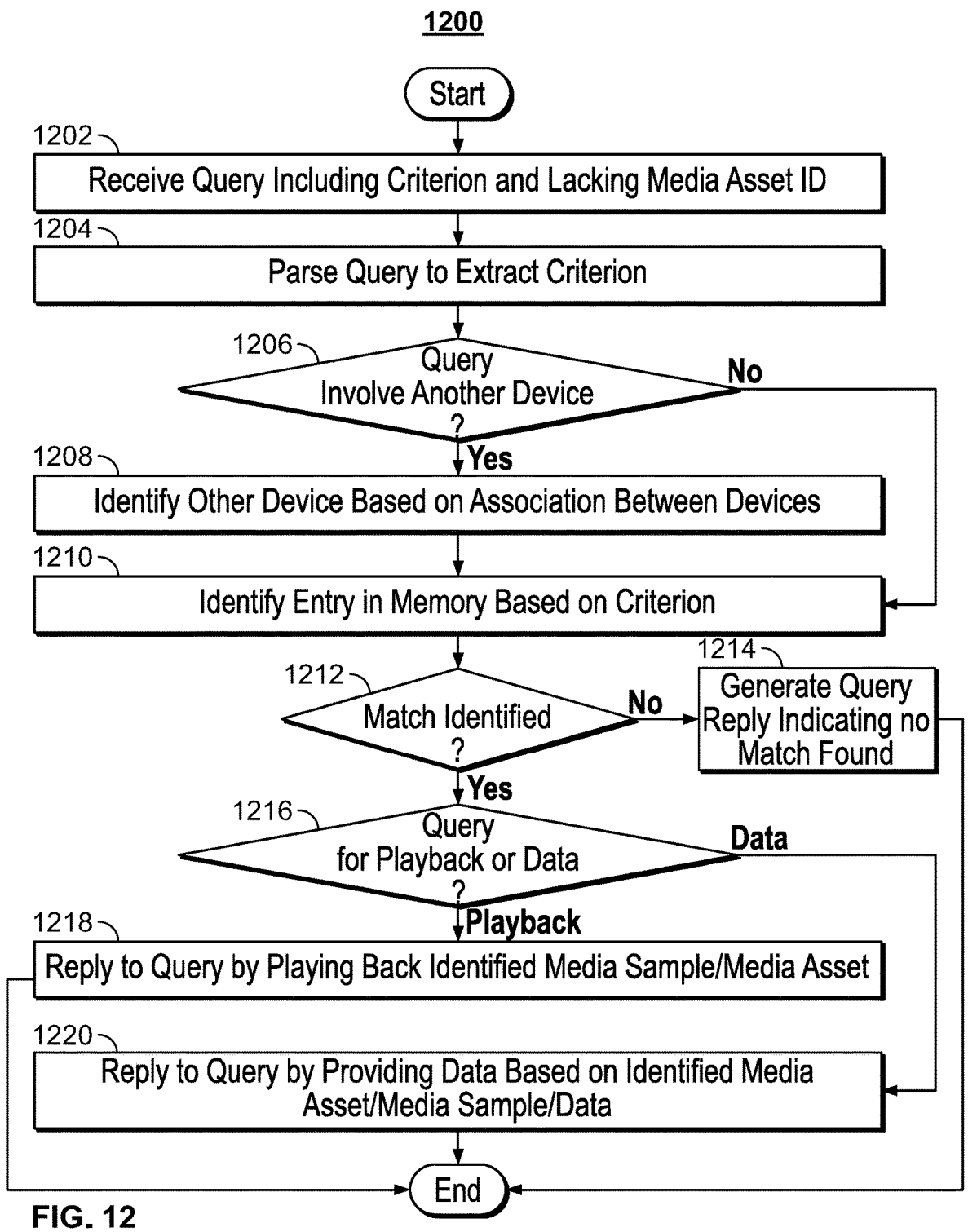
FIG. 12 depicts an illustrative flowchart of a process for generating a reply to a contextual query, in accordance with some embodiments of the disclosure.

FIG. 12 depicts an illustrative flowchart of a process 1200 for handling and replying to a contextual query based on media samples (such as media sample 214) automatically captured by a computing device (such as computing device 202), in accordance with some embodiments of the disclosure. At block 1202, control circuitry 304 and/or control circuitry 322 receive a query entered by way of computing device 202 (e.g., via user input interface 310, microphone 316, and/or the like). Although the query includes one or more criteria (e.g., contextual criteria), the query lacks an identifier of a media asset. At block 1204, control circuitry 304 and/or control circuitry 322 parse the query to extract the one or more criteria included therein.

At block 1206, based on the criteria extracted from the query at block 1204, control circuitry 304 and/or control circuitry 322 determine whether the query involves another computing device (e.g., a computing device other than the computing device 202 from which the query was received at block 1202). For example, if the query mentions an acquaintance (e.g., Sally 106 from the query 114 in FIG. 1), then control circuitry 304 and/or control circuitry 322 may determine at block 1206 that the query involves Sally's computing device 112. As another example, the query may request "music that Sally heard at lunch earlier today," in which case control circuitry 304 and/or control circuitry 322 may determine at block 1206 that the query involves Sally's computing device 112 as well. If the query lacks any mention of an acquaintance, then control circuitry 304 and/or control circuitry 322 may determine at block 1206 that the query does not involve another computing device. If control circuitry 304 and/or control circuitry 322 determine that the query involves another computing device ("YES" at block 1206), then control passes to block 1208. If control circuitry 304 and/or control circuitry 322 determine that the query does not involve another computing device ("NO" at block 1206), then control bypasses block 1208 and passes to block 1210.

At block 1208, control circuitry 304 and/or control circuitry 322 identify the one or more other involved computing devices based on an association between the computing devices indicated in database 600 (FIG. 6). For instance, control circuitry 304 and/or control circuitry 322 may identify a link between computing device 202 and the other involved computing device(s) by searching the database 600 for entries that include an identifier of computing device 202 as the capturing device identifier (field 606) or the associated device identifier (field 614). For each entry in database 600 that includes the identifier of computing device 202 as the capturing device identifier (field 606), control circuitry 304 and/or control circuitry 322 may retrieve, as a possible candidate for the other involved device, the associated device identifier (field 614) in that entry. For each entry that includes the identifier of computing device 202 as the associated device identifier (field 614), control circuitry 304 and/or control circuitry 322 may retrieve, as a possible candidate for the other involved device, the capturing device identifier (field 606) in that entry. Control circuitry 304 and/or control circuitry 322 may identify, within the pool of possible candidates for the other involved device, the computing device of the acquaintance mentioned in the query. For example, the capturing device identifiers (field 606) and/or the associated device identifiers (field 614) may include names of people registered to the respective computing devices. In this manner, control circuitry 304 and/or control circuitry 322 may search the pool of possible candidates for the other involved device for the name of the acquaintance mentioned in the query.

At block 1210, based on the criteria (e.g., contextual criteria, such as time, location, activity, or associated device information, as described above in the context of FIG. 7, FIG. 8, FIG. 9, and FIG. 10, respectively) extracted from the query at block 1204, control circuitry 304 and/or control circuitry 322 search database 600 to identify an entry that is targeted in the query, even though the query lacks an identifier of a media sample or a corresponding media asset identifier. For instance, if the query includes a time or time range (e.g., today, yesterday, this afternoon, 4:00 PM, and/or the like), control circuitry 304 and/or control circuitry 322 may search database 600 to identify, as possible candidates for the entry targeted in the query, entries having time identifiers (field 608) that match the time or time range referenced in the query. Similarly, if the query includes a location or location range (e.g., at home, in a restaurant, and/or the like), control circuitry 304 and/or control circuitry 322 may search database 600 to identify, as possible candidates for the entry targeted in the query, entries having location identifiers (field 610) that match the location or location range referenced in the query. If the query mentions an activity (e.g., traveling in a taxi), control circuitry 304 and/or control circuitry 322 may search database 600 to identify, as possible candidates for the entry targeted in the query, entries having activity identifiers (field 612) that match the activity referenced in the query. If control circuitry 304 and/or control circuitry 322 identify at block 1212 only single entry as the entry targeted in the query, then control circuitry 304 and/or control circuitry 322 may store that single entry (e.g., a media sample identifier or other corresponding identifier) in storage 308 and/or 326 for responding to the query. If control circuitry 304 and/or control circuitry 322 identify at block 1212 multiple entries as possible candidates for the entry targeted in the query, then control circuitry 304 and/or control circuitry 322 may: (1) store the multiple entries (or corresponding identifiers) in storage 308 and/or 326 for responding to the query (e.g., by presenting the candidate entries, or identifiers, sequentially or in a list) and/or (2) narrow down the multiple entries to the single targeted entry or a smaller number of possible entries (e.g., by identifying the entry or entries that satisfy all of multiple contextual criteria included in the query), and store the narrowed down entry(ies) in storage 308 and/or 326 for responding to the query. If no match is found based on the searching at block 1210 ("NO" at block 1212), then control passes to block 1214, at which control circuitry 304 and/or control circuitry 322 generate a query reply indicating that not match is found. If, on the other hand, one or more matches are found based on the searching at block 1210 ("YES" at block 1212), then control passes to block 1216.

The query may request one or more different types of information. For example, the query may request playback of a media sample (e.g., media sample 214). The query may request playback of a media asset (e.g., a song of which the media sample 214 has been determined at block 410 (FIG. 4 and FIG. 11) to be a portion). As another example, the query may request a name of a song heard earlier today, which may be reflected as media asset metadata (e.g., indicated in a title field 620-1 of the database 600 in FIG. 6). At block 1216, based on the criteria extracted from the query at block 1204, control circuitry 304 and/or control circuitry 322 determine whether the query requests playback of a media sample, playback of a media asset, or other data (e.g., media asset metadata). If control circuitry 304 and/or control circuitry 322 determines that the query requests playback of a media sample or media asset ("PLAYBACK" at block 1216), then control passes to block 1218, at which control circuitry 304 and/or control circuitry 322 generate a reply to the query by playing back (e.g., by way of display 312 and/or speaker 314) the targeted media sample(s) or media asset(s) identified at block 1210. If control circuitry 322 of server 204 generates the reply, then control circuitry 322 may communicate the reply to computing device 202 by way of I/O path 320, communication 208, and I/O path 302 for presentation to the user of computing device 202. If control circuitry 304 and/or control circuitry 322 determines that the query requests media asset metadata ("DATA" at block 1216), then control passes to block 1220, at which control circuitry 304 and/or control circuitry 322 generate a reply to the query by presenting (e.g., by way of display 312 and/or speaker 314) the targeted media asset metadata identified at block 1210.

The processes discussed above are intended to be illustrative and not limiting. One skilled in the art would appreciate that the actions of the processes discussed herein may be omitted, modified, combined, and/or rearranged, and any additional actions may be performed without departing from the scope of the invention. More generally, the above disclosure is meant to be exemplary and not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the systems and methods described herein may be performed in real time. It should also be noted that the systems and/or methods described above may be applied to, or used in accordance with, other systems and/or methods.

What is claimed is:

1. A method for facilitating contextual queries based on media samples automatically captured by a computing device, the method comprising:
   receiving, at a server from a first computing device by way of a communication network, a media sample of a media asset automatically captured by the computing device;
   determining that a second computing device socially linked to the first computing device is within a predetermined distance of the first computing device;
   obtaining contextual information corresponding to the captured media sample, wherein the contextual information is an identifier of the second computing device;
   storing the contextual information in a memory;
   storing the media sample in a memory indexed by the contextual information;
   receiving, at the server from the computing device by way of the communication network, a query including a criterion, wherein the query lacks an identifier of the media asset;
   identifying the media sample in the memory by matching the criterion to the identifier of the second computing device;
   generating a reply to the query based on a result of the identifying; and
   communicating the reply to the computing device by way of the communication network.

2. The method of claim 1, further comprising:
   identifying the media asset of the captured media sample by:
     generating a media fingerprint based on the media sample; and
     identifying the media asset based on the media fingerprint; and
   associating the media asset with the media sample in the memory.

3. The method of claim 2, further comprising:
   identifying media asset metadata corresponding to the media asset, wherein the reply includes the media asset metadata.

4. The method of claim 2, wherein the media fingerprint is an audio fingerprint, the media asset includes video content, and the identifying the media asset in the database based on the media fingerprint comprises identifying, in the database, an association between the video content and the audio fingerprint.

5. The method of claim 1, wherein the contextual information comprises a time identifier.

6. The method of claim 5, wherein the obtaining the contextual information comprises generating at the server, the time identifier based on a time when the media sample is received from the computing device.

7. The method of claim 5, wherein the obtaining the contextual information comprises receiving the time identifier at the server from the computing device by way of the communication network.

8. The method of claim 1, wherein the contextual information comprises a location identifier, wherein the obtaining the contextual information comprises receiving the location identifier at the server from the computing device by way of the communication network.

9. The method of claim 1, wherein the second computing device is identified by the first computing device during the automatic media sample capture of the media asset.

10. The method of claim 9, wherein the obtaining the contextual information comprises:
    searching a social media database for social media links involving the first computing device; and
    determining, based on the searching, that the first computing device is associated with the second computing device.

11. The method of claim 1, wherein the contextual information comprises an activity identifier, wherein the activity identifier comprises transportation information, and wherein the obtaining the contextual information comprises receiving the transportation information from the computing device or a transportation provider system.

12. A method for facilitating contextual queries based on media samples automatically captured by a computing device, comprising:
    automatically capturing, by a first computing device, a media sample of a media asset;
    determining that a second computing device socially linked to the first computing device is within a predetermined distance of the first computing device;
    obtaining contextual information corresponding to the captured media sample, which includes an identifier of the second computing device;
    storing the contextual information in a memory;
    storing the media sample in a memory of the computing device and indexed by the contextual information;
    receiving, via a user interface of the computing device, a query including a criterion, wherein the query lacks an identifier of the media asset;
    identifying the media sample in the memory by matching the criterion to the identifier of the second computing device;
    generating a reply to the query based on a result of the identifying; and
    providing the reply by way of the user interface of the computing device.

13. The method of claim 12, wherein the contextual information comprises a time identifier.

14. The method of claim 13, wherein the obtaining the contextual information comprises generating, at the computing device, the time identifier based on a time indicated by a clock of the computing device when the media sample is captured.

15. The method of claim 14, further comprising communicating the time identifier to a server by way of a communication network.

16. The method of claim 12, wherein the contextual information comprises a location identifier.

17. The method of claim 16, wherein the obtaining the contextual information comprises generating, at the computing device, the location identifier based on a location indicated by a geo-location subsystem of the computing device when the media sample is captured.

18. The method of claim 12, wherein the second computing device is identified by the first computing device during the automatic media sample capture of the media asset.

19. The method of claim 18, wherein the obtaining the contextual information comprises determining, based on an application of first computing device, that the first computing device is associated with the second computing device by way of a social media network.

20. The method of claim 18, wherein the obtaining the contextual information comprises:
    detecting the second computing device by way of a wireless communication subsystem of the first computing device; and
    determining, based on the detecting, that the second computing device is in proximity with the first computing device.

* * * * *